(12) United States Patent
Ali et al.

(10) Patent No.: US 10,669,201 B2
(45) Date of Patent: Jun. 2, 2020

(54) STRUCTURAL LIGHTWEIGHT CONCRETE COMPRISING WASTE PLASTICS

(71) Applicant: King Fahd University of Petroleum and Minerals, Dhahran (SA)

(72) Inventors: Mohammed Rizwan Ali, Dhahran (SA); Jobin Jose, Dhahran (SA); Salah U. Al-Dulaijan, Dhahran (SA); Shaik Inayath Basha, Dhahran (SA); Mohammed Maslehuddin, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/026,734

(22) Filed: Jul. 3, 2018

(65) Prior Publication Data
US 2019/0337850 A1 Nov. 7, 2019

Related U.S. Application Data

(60) Provisional application No. 62/666,133, filed on May 3, 2018.

(51) Int. Cl.
| | | |
|---|---|---|
| *C04B 18/20* | (2006.01) | |
| *C04B 28/04* | (2006.01) | |
| *C04B 14/28* | (2006.01) | |
| *C04B 14/06* | (2006.01) | |
| *C04B 24/26* | (2006.01) | |
| *C04B 40/00* | (2006.01) | |
| *C04B 18/02* | (2006.01) | |
| *C04B 111/40* | (2006.01) | |
| *C04B 103/32* | (2006.01) | |

(52) U.S. Cl.
CPC .............. *C04B 18/20* (2013.01); *C04B 14/06* (2013.01); *C04B 14/28* (2013.01); *C04B 18/027* (2013.01); *C04B 24/2647* (2013.01); *C04B 28/04* (2013.01); *C04B 40/0032* (2013.01); *C04B 2103/32* (2013.01); *C04B 2111/40* (2013.01); *C04B 2201/30* (2013.01); *C04B 2201/50* (2013.01)

(58) Field of Classification Search
CPC ....... C04B 18/20; C04B 18/027; C04B 18/06; C04B 18/28; C04B 40/0032; C04B 24/2647; C04B 28/04; C04B 2201/30; C04B 2201/50; C04B 2103/32; C04B 2111/40

See application file for complete search history.

(56) References Cited

U.S. PATENT DOCUMENTS

| | | | | |
|---|---|---|---|---|
| 5,120,768 A | * | 6/1992 | Sisson ...................... | B03B 1/04 209/166 |
| 2017/0141719 A1 | * | 5/2017 | Horgnies ................ | C04B 41/52 |
| 2017/0260093 A1 | * | 9/2017 | Barrow ................... | C04B 20/02 |
| 2017/0283319 A1 | | 10/2017 | Maslehuddin et al. | |

FOREIGN PATENT DOCUMENTS

| | | |
|---|---|---|
| CN | 100462323 C | 2/2009 |
| CN | 104478348 B | 8/2016 |
| CN | 106007528 A | 10/2016 |
| WO | 93/01933 A1 | 2/1993 |

OTHER PUBLICATIONS

Zaleska, M., et al.; Thermophysics, 2016, p. 1-5.*
Colangelo, F., et al.; Composites Part B, 2016, vol. 106, p. 234-241.*
Saikia, N., et al.; Materials Research, 2013, vol. 16, No. 2, p. 341-350.*
Rai, et al. ; Study of Waste Plastic Mix Concrete with Plasticizer ; Mar. 15, 2012 ; International Scholarly Research Network, ISRN Civil Engineering, vol. 2012, Article ID 469272 ; 5 pages.
Hama, et al. ; Fresh properties of self-compacting concrete with plastic waste as partial replacement of sand ; Jan. 20, 2017 ; College of Engineering, University of Anbar, Iraq, International Journal of Sustainable Built Environment (2017) ; 10 Pages.
Guendouz, et al. ; Use of plastic waste in sand concrete ; 2016 ; J. Mater. Environ. Sci. 7 (2) (2016) 283-289 ; 8 Pages.
Elsalah, et al. ; The influence of recycled expanded polystyrene (EPS) on concrete properties: Influence on flexural strength, water absorption and shrinkage ; Dec. 2013 ; AIP Conference Proceedings 1569, 181 (2013) ; Abstract ; 2 pages.

* cited by examiner

*Primary Examiner* — Robert S Jones
(74) *Attorney, Agent, or Firm* — Oblon, McClelland, Maier & Neustadt, L.L.P.

(57) ABSTRACT

A method of making a structural lightweight and thermal insulating concrete is described. The concrete has a coarse aggregate partly replaced by recycled plastic pieces. This enables the concrete to maintain a high compressive strength, low thermal conductivity, and low weight, while providing a use for waste plastic. The waste plastic pieces may comprise polyethylene in the form of flakes, fibers, or granules. Due to its low unit weight, adequate compressive strength and high thermal resistance the developed concrete can be used as a structural lightweight and thermal insulating concrete. The use of this concrete leads to economic and environmental benefits.

18 Claims, 12 Drawing Sheets

STRUCTURAL LIGHTWEIGHT CONCRETE COMPRISING WASTE PLASTICS

CROSS REFERENCE TO RELATED APPLICATIONS

This application claims the benefit of priority from U.S. Provisional Application No. 62/666,133 filed May 3, 2018, which is incorporated herein by reference in its entirety.

STATEMENT REGARDING PRIOR DISCLOSURES BY THE INVENTORS

Aspects of this technology were described in an M.S. thesis presentation given by Shaik Inayath Basha on May 16, 2017 at the Department of Civil and Environmental Engineering at King Fahd University of Petroleum & Minerals in Dhahran, Saudi Arabia, with the title of "Development of Light Weight, Thermal Resistant Concrete Utilizing Recycled Plastic Aggregates," and is incorporated herein by reference in its entirety.

BACKGROUND OF THE INVENTION

Technical Field

The present invention relates to a composition for making a structural lightweight and thermal insulating concrete having a portion of the coarse aggregates replaced with waste plastic particles.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Lightweight concrete (LWC) is a conglomerate of cement and lightweight aggregates. It has a bulk density in the range of 300 to 2,000 kg/m$^3$ compared to a value of 2,200 to 2,600 kg/m$^3$ of normal weight concrete (NWC). Some of the advantages of LWC include: (i) reduction in the dead load, and (ii) lighter and smaller elements. LWC that can be used to produce structural members is called structural lightweight concrete (SLWC)

According to ACI 213, SLWC is a concrete that is prepared with lightweight aggregates and whose average unit weight ranges between 1,400 to 2,000 kg/m$^3$, and it has a compressive strength of more than 20.0 N/mm$^2$. SLWC provides technical, environmental, and economic advantages, and is on the way to become a material of the future, with the world growing more conscious of energy conservation and environmental protection.

There are clear advantages of SLWC over NWC. SLWC has a greater strength/weight ratio, lower thermal conductivity, superior fire-resistance, and better durability. The use of SLWC decreases the weight of a structural member, which leads to a reduction in the sizes of columns, beams, walls, and foundations and therefore reduces the resulting seismic loads and earthquake damage. However, the most significant potential advantage of SLWC is the environmental protection, particularly, if the raw materials needed for the production of SLWC are derived from waste products. While several materials have been used in the production of SLWC, there is a need to beneficially utilize recycled plastic in concrete. Such a use will lead to technical and economic advantages and also results in environmental benefits by finding a use for non-biodegradable waste plastic.

Over 300 million metric tons of plastic are consumed globally per year, and it has grown over the last five years at an estimated rate of 3.4% annually. The exponential growth in population, urbanization, trade, and industry is not only accelerating plastic consumption but also increasing the production rate of all classes of waste plastics.

The accumulation of huge volumes of commodity waste plastics derived from municipal solid waste and other household items has become a major waste management issue over the past two decades. The threat of plastic waste seems to be always growing as it is non-biodegradable and may lead to contamination of soil, air and water, as shown in FIGS. 1A-1F.

In the plastic waste stream, polyethylene (HDPE & LDPE) forms the largest fraction, followed by PET, PP, and PS. The earlier trends, such as land filling and incineration of these non-biodegradable materials create substantial air pollution, and in the long-run a worldwide threat to the environment and public health.

Recovery and recycling, however, remain insufficient, and millions of tons of plastics end up in landfills and oceans each year. The mechanical recycling of the plastic waste and its utilization in concrete or mortar preparation appears as one solution for disposing the used plastics, because of economic and environmental benefits.

In view of the forgoing, one objective of the present invention is to provide a method of making a lightweight structural concrete with high thermal insulation. Recycled plastic is utilized as a coarse aggregate.

BRIEF SUMMARY OF THE INVENTION

According to a first aspect, the present disclosure relates to a method of making a structural lightweight concrete. This first involves mixing 12-25 wt % Portland cement, 37-57 wt % fine aggregate, 5-40 wt % coarse aggregate, and 5-12 wt % water to form a wet concrete slurry, wherein each weight percentage is relative to a total weight of the wet concrete slurry. Then the wet concrete slurry is cured to produce the structural lightweight concrete. The coarse aggregate comprises 10-100 wt % waste plastic pieces, relative to a total weight of the coarse aggregate, and these waste plastic pieces have an average longest dimension of 1-12 mm.

In one embodiment, the waste plastic pieces are in the form of granules, fibers, and/or flakes.

In a further embodiment, the waste plastic pieces are in the form of granules having a cylindrical shape with an average diameter of 1-4 mm and an average length of 1-7 mm.

In a further embodiment, the waste plastic pieces are in the form of flakes having an average thickness of 0.3-0.8 mm and an average longest dimension of 1-8 mm.

In a further embodiment, the waste plastic pieces are in the form of fibers having an average diameter of 0.2-0.8 mm and an average length of 2-12 mm.

In one embodiment, the waste plastic pieces have a specific gravity of 0.80-1.20.

In one embodiment, the waste plastic pieces have a surface roughness Ra of 1-50 μm.

In one embodiment, the method further comprises reshaping the waste plastic pieces by melting, extruding, or grinding.

In one embodiment, the waste plastic pieces comprise 20-100 wt % polyethylene, relative to a total weight of the weight plastic pieces.

In one embodiment, the wet concrete slurry further comprises 0.1-2.0 wt % of a superplasticizer relative to a total weight of the wet concrete slurry.

In one embodiment, the superplasticizer is a polycarboxylate ether.

In a further embodiment, where the superplasticizer is a polycarboxylate ether, the wet concrete slurry has a slump of 50-150 mm.

In one embodiment, the Portland cement is an ASTM C 150 cement selected from the group consisting of Type I, Type Ia, Type II, Type IIa, Type II(MH), Type II(MH)a, Type III, Type IIIa, and Type IV.

In one embodiment, the fine aggregate is sand with an average particle size of less than 1.5 mm.

In one embodiment, the coarse aggregate further comprises at least one selected from the group consisting of limestone, perlite, and scoria, at a weight percentage of 1-90 wt % relative to a total weight of the coarse aggregate.

In a further embodiment, limestone is present, having an average particle size of 1-20 mm.

In one embodiment, the structural lightweight concrete has a compressive strength of 20-40 MPa.

In one embodiment, the structural lightweight concrete has a thermal conductivity of 0.50-1.10 W/(m·K).

In one embodiment, the structural lightweight concrete has a unit weight of 1,400-2,000 kg/m$^3$.

In one embodiment, the structural lightweight concrete does not comprise fly ash.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1A:
FIG. 1A is an image of waste plastic obstructing and polluting a waterway.
Figure 1B:
FIG. 1B is an image of tons of waste plastic stacked at a disposal site.
Figure 1C:
FIG. 1C is an image of plastic waste dumped in a dumping yard.
Figure 1D:
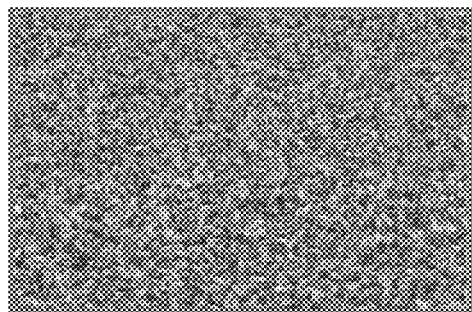
FIG. 1D is an image of waste plastic bottles floating on a body of water.
Figure 1E:
FIG. 1E is an image of cows eating plastic waste.
Figure 1F:
FIG. 1F is an image of a seal trapped in a plastic net.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

As used herein, specific gravity is the ratio of the density of a substance to the density of a reference substance; equivalently, it is the ratio of the mass of a substance to the mass of a reference substance for the same given volume. Apparent specific gravity is the ratio of the weight of a volume of the substance to the weight of an equal volume of the reference substance. As used herein, the reference substance is water at a temperature 2-25° C., preferably 4-22° C. and a pressure of approximately 1 atm (~101 kPa).

According to a first aspect, the present disclosure relates to a method of making a structural lightweight concrete (SLWC). This method involves mixing Portland cement, fine aggregate, coarse aggregate, and water to form a wet concrete slurry. The wet concrete slurry is cured to produce the structural lightweight concrete.

As used herein, "structural lightweight concrete" also includes aggregate that is either entirely lightweight aggregate or a combination of lightweight and normal density aggregate. As used herein, "lightweight aggregate" as defined in ASTM C 330 has a bulk density of less than 1120 kg/m³ (70 lb/ft³) for fine aggregate and less than 880 kg/m³ (55 lb/ft³) for coarse aggregate. As used herein, the terms "fine" and "coarse" refer to the average particle size, here the average particle size of the aggregate and additives of the structural lightweight concrete. As used herein, average particle size refers to the longest linear dimension of the particle. In terms of the present disclosure, "coarse" may refer to having an average particle size of greater than 1.5 mm, preferably greater than 5 mm, preferably greater than 10 mm, while "fine" may refer to having an average particle size of 1.5 mm or less, preferably 1.0 mm or less.

"Structural lightweight concrete" is further defined in ASTM C 330 as concrete having a minimum 28-day compressive strength of 17 MPa (2500 psi) and an equilibrium density in the range of 1120-1920 kg/m³ (70-120 lb/ft³). This stands in contrast to normal weight concrete. As used herein, "normal weight concrete" refers to concrete having an equilibrium density of 2240-2480 kg/m³ (140-155 lb/ft³). This definition is not a specification, project specifications vary by necessity. While structural lightweight concrete with an equilibrium density of 1120-1680 kg/m³ (70-105 lb/ft³) is infrequently used, most structural lightweight concrete has an equilibrium density of 1680-1920 kg/m³ (105-120 lb/ft³). As used herein, "equilibrium density" as defined in ASTM 567 is the density reached by structural lightweight concrete after exposure to relative humidity of 50±5% and a temperature of 23±2° C. for a period of time sufficient to reach a density that changes less than 0.5% in a period of 28 days.

In a preferred embodiment, the cement of the lightweight concrete composition of the present disclosure is a hydraulic cement, preferably a sulfoaluminous clinker, preferably Portland cement. As used herein, "Portland cement" refers to the most common type of cement in general use around the world developed from types of hydraulic lime and usually originating from limestone. It is a fine powder produced by heating materials in a kiln to form what is called clinker, grinding the clinker, and adding small amounts of other materials. The Portland cement is made by heating limestone (calcium carbonate) with other materials (such as clay) to >1400° C. in a kiln, in a process known as calcination, whereby a molecule of carbon dioxide is liberated from the calcium carbonate to form calcium oxide, or quicklime, which is then blended with the other materials that have been included in the mix to from calcium silicates and other cementitious compounds. The resulting hard substance, called "clinker" is then ground with a small amount of gypsum into a powder to make ordinary Portland cement (OPC). Several types of Portland cement are available with the most common being called ordinary Portland cement (OPC) which is grey in color. The low cost and widespread availability of the limestone, shales, and other naturally occurring materials used in Portland cement make it one of the low cost materials widely used throughout the world. However, Portland cement is caustic, can contain some hazardous components and carries environmental concerns such as the high energy consumption required to mine, manufacture, and transport the cement and the related air pollution including the release of greenhouse gases, dioxins, $NO_X$, $SO_2$, and particulates.

Clinkers make up approximately 90% of Portland cement along with a limited amount of calcium sulfate (which controls the set time) and up to approximately 5% minor constituents (i.e. filler) as allowed by various standards. In a preferred embodiment, clinkers are nodules with an average particle diameter of approximately 2-30 mm, preferably 5-25 mm, preferably 8-20 mm of a sintered material that is produced when a raw mixture of predetermined composition is heated to high temperature. The key chemical reaction which defines Portland cement from other hydraulic limes occurs at these temperatures (>1200° C.) and is when belite ($Ca_2SiO_4$) combines with calcium oxide (CaO) to form alite ($Ca_3SiO_5$).

Portland cement clinkers are generally made by heating (i.e. in a cement kiln) a mixture of raw materials to a calcining temperature of above 500° C. and then a fusion temperature, which is approximately 1400° C. for modern Portland cements to sinter the materials into clinker. The materials in Portland cement clinker are alite, belite, tricalcium aluminate, and tetracalcium alumino ferrite. The aluminum, iron, and magnesium oxides are present as a flux allowing the calcium silicates to form at a lower temperature and do not generally contribute to strength. For specific Portland cements (i.e. low heat or sulfate resistant types) it may be necessary to limit the amount of tircalcium aluminate ($3CaO.Al_2O_3$) that is formed. The major raw material for the clinker making process is usually limestone ($CaCO_3$) mixed with a second material containing clay as source of alumino silicate. Often, an impure limestone which contains clay or $SiO_2$ is used. The $CaCO_3$ content of these limestones can be as low as 80%. Secondary raw materials (materials in the raw mix other than limestone) depend on the purity of the limestone. Secondary raw materials may include, but are not limited to, clay, shale, sand, iron ore, bauxite, fly ash, slag and the like, when a cement kiln is fired by coal, the ash of the coal may act as a secondary raw material.

Often to achieve the desired setting qualities in the finished Portland cement product, a quantity (~1-10 wt %, preferably 2-8 wt %, or about 5 wt %) of calcium sulfate (often in the form of gypsum or anhydrite) is added to the clinker and the mixture is finely ground to form the finished cement powder, such as for example in a cement mill. The grinding process may be controlled to obtain a powder having a broad particle size range, in which typically 15% by mass consists of particles below 5 μm in diameter, and 5% by mass consists of particles above 45 μm in diameter. The measure of fineness most closely associated with cement is the specific surface area, which refers to the total particle surface area of a unit mass of the cement. The rate of initial reaction (~up to 24 hours) of the cement on addition of water is directly proportional to the specific surface area. In a preferred embodiment, the structural lightweight concrete of the present disclosure comprises cement having a specific surface area in the range of 250-450 m²·kg⁻¹, preferably 275-425 m²·kg⁻¹, preferably 300-400 m²·kg⁻¹, preferably 320-380 m²·kg⁻¹. Typically, general purpose Portland cement falls within these ranges, although it may be as high as 450-700 m²·kg⁻¹ for "rapid hardening" cements.

As used herein, "Portland cement" or "Portland cement clinker" has a tricalcium silicate ($(CaO)_3.SiO_2$, $C_3S$) content of 45-75 wt % relative to the total weight of the cement, a dicalcium silicate ($(CaO)_3.SiO_2$, $C_2S$) content of 7-32 wt % relative to the total weight of the cement, a tricalcium aluminate ($(CaO)_3.Al_2O_3$, $C_3A$) content of 0-13 wt % relative to the total weight of the cement, a tetracalcium aluminoferrite ($(CaO)_4.Al_2O_3.Fe_2O_3$, $C_4AF$) content of 0-18 wt % relative to the total weight of the cement, and a gypsum ($CaSO_4.2H_2a$) content of 0-10 wt % relative to the total weight of the cement. Furthermore, as used herein "Portland cement or "Portland cement clinker" has a calcium oxide (CaO, C) content of 61-67 wt % relative to the total weight of the cement, a silicon dioxide ($SiO_2$, S) content of 19-23 wt % relative to the total weight of the cement, an aluminum oxide ($Al_2O_3$, A) content of 2.5-6 wt % relative to the total weight of the cement, a ferric oxide ($Fe_2O_3$, F) content of 0-6 wt % relative to the total weight of the cement, and a sulfate ($\bar{S}$) content of 1.5-4.5 wt % relative to the total weight of the cement.

The wet concrete slurry comprises Portland cement at a weight percentage of 12-25 wt %, preferably 15-22 wt %, more preferably 16-20 wt %, or about 17 wt % or 19 wt %, relative to a total weight of the wet concrete slurry. However, in some embodiments, the wet concrete slurry may comprise less than 12 wt % or greater than 25 wt % Portland cement. In one embodiment, the Portland cement is an ASTM C 150 cement selected from the group consisting of Type I, Type Ia, Type II, Type IIa, Type II(MH), Type II(MH)a, Type III, Type IIIa, and Type IV. Preferably the Portland cement is an ASTM C150 Type I cement, and may have a composition similar to that shown in Table 1. In other embodiments, a different type of Portland cement may be used, or a blend of Portland cement and another cement such as EN 197-1 CEM I, CEM II, CEM III, CEM IV, CEM V; or CSA A3000-08 GU, GUL, MS, MH, MHL, HE, HEL, LH, LHL, HS; white Portland cement, Portland blast furnace slag cement (or blast furnace cement), Portland fly ash cement, Portland pozzolan cement, Portland silica fume cement, masonry cements, expansive cements, white blended cements, colored cements, very finely ground cements, pozzolan lime cements, slag lime cements, supersulfated cements, calcium sulfoaluminate cements, "natural" cements and geopolymer cements, and the like and mixtures thereof. The Portland cement may have a specific gravity of 2.0-4.0, preferably 2.5-3.5, preferably 2.75-3.4, preferably 3.0-3.3, preferably 3.1-3.2, or about 3.15. In one embodiment, the cement content in a mixture of the dry ingredients may be 300-400 kg/m³, preferably 320-380 kg/m³, or about 350 kg/m³ or 370 kg/m³.

The wet concrete slurry also comprises aggregates. As used herein, "construction aggregate" or simply "aggregate" refers to a broad category of particulate material used in construction. Exemplary materials include, but are not limited to, sand, gravel, crushed stone, slag, recycled concrete, geosynthetic aggregates, and the like. Aggregates are a component of composite materials, such as concrete; the aggregates serve as reinforcement to add strength to the overall composite material. The ASTM publishes a listing of specifications including, but not limited to, ASTM D 692 and ASTM D 1073 for various construction aggregate products, which by their individual design are suitable for specific construction purposes. The products include specific types of coarse and fine aggregate designed for such uses as additives to concrete mixes. Fine and coarse aggregates make up the bulk of a concrete mixture. Sand, natural gravel, and crushed stone are used mainly for this purpose. Recycled aggregates (from construction, demolition, and excavation waste) are increasingly used as partial replacements for natural aggregates, while a number of manufactured aggregates, including air-cooled blast furnace slag and bottom ash also find use. The presence of aggregate greatly increases the durability of concrete above that of cement, which is a brittle material in its pure state, reduces cost, and controls cracking caused by temperature changes. Thus, concrete is a true composite material. Sources of these basic materials can be grouped into three main areas: mining of mineral aggregate deposits (i.e. sand, gravel and stone), the use of waste slag from the manufacture of iron, steel and petroleum products or recycling of concrete (itself chiefly manufactured from mineral aggregates), and obtaining some materials that are used as specialty lightweight aggregates (i.e. clay, pumice, perlite, vermiculite).

Aggregates, from different sources, or produced by different methods, may differ considerably in particle shape, size, and texture. The shapes of the aggregates of the present disclosure may be cubical and reasonably regular, essentially rounded, or angular and irregular. Surface texture may range from relatively smooth with small exposed pores to irregular with small to large exposed pores. Particle shape and surface texture of both fine and coarse aggregates influence proportioning of mixtures in such factors as workability, pumpability, fine-to-coarse aggregate ratio, cement binder content, and water requirement.

The wet concrete slurry comprises the fine aggregate at a weight percentage of 37-57 wt %, preferably 40-55 wt %, more preferably 42-47 wt %, even more preferably 44-45 wt %, relative to a total weight of the wet concrete slurry. However, in some embodiments, the fine aggregate may be present at a weight percentage of less than 37 wt % or greater than 57 wt %. In one embodiment, the fine aggregate is sand, such as desert sand or dune sand, with an average particle size of less than 1.5 mm. In one embodiment, the fine aggregate may have an average particle size of 0.1-5 mm, preferably 0.2-2 mm, more preferably 0.3-1.5 mm, even more preferably 0.4-1.0 mm. In an alternative embodiment, a fine aggregate may not be present in the wet cement slurry or in a cured concrete composition. The fine aggregate may have a specific gravity of 1.5-3.25, preferably 1.75-3.0, preferably 2.0-2.8, preferably 2.25-2.6. As used herein, water absorption refers to the penetration of water into aggregate particles with resulting increase in particle weight. In one embodiment, the fine aggregate has a water absorption of 0.1-1.0%, preferably 0.2-0.8%, preferably 0.4-0.6%, or about 0.5%.

As mentioned previously, the fine aggregate is sand, preferably dune sand. As used herein, "sand" refers to a naturally occurring granular material composed of finely divided rock and mineral particles. It is defined by size in being finer than gravel and coarser than silt. The composition of sand varies, depending on the local rock sources and conditions, but the most common constituent of sand is silica (silicon dioxide, or $SiO_2$), usually in the form of quartz. The second most common type of sand is calcium carbonate, for example aragonite. In terms of the present disclosure, the fine aggregate of the concrete composition may be silicon dioxide sand, preferably quarzitic silicon dioxide, preferably quarzitic sand, preferably dune sand.

In terms of particle size, sand particles range in diameter from 0.0625 mm to 2 mm. An individual particle in this range is termed a sand grain. By definition sand grains are between gravel (particles ranging from 2 mm to 64 mm) and silt (particles ranging from 0.004 mm to 0.0625 mm). ISO 14688 grades sands as fines, medium and coarse with ranges of 0.063 mm to 0.2 mm to 0.63 mm to 2.0 mm. Sand is also commonly divided into five subcategories based on size: very fine sand (0.0625-0.125 mm diameter), fine sand (0.125-0.250 mm diameter), medium sand (0.250-0.500 mm diameter), coarse sand (0.500-1.0 mm diameter) and very coarse sand (1.0-2.0 mm diameter). These categories of based on the Krumbein phi scale, where size in $\phi=-\log_2 D$; wherein D is the particle size in mm. On this scale, for sand the value of $\phi$ varies from −1 to +4, with the divisions. In terms of the present disclosure, the fine aggregate of the wet concrete slurry may be sand, and may be very fine sand, fine sand, medium sand, or even coarse sand, preferably very fine sand, fine sand or medium sand.

In one embodiment, the fine aggregate is sand with an average particle size of less than 700 μm, preferably less than 600 μm, preferably less than 500 μm, preferably less than 400 μm, preferably less than 300 μm, preferably less than 200 μm, preferably less than 100 μm, such as for example 500-700 μm, preferably 525-675 μm, preferably 550-650 μm, preferably 575-625 μm. As used herein, the coefficient of variation or relative standard deviation is expressed as a percentage and defined as the ratio of the particle size standard deviation ($\sigma$) to the particle size mean ($\mu$) multiplied by 100. In a preferred embodiment, the fine aggregate of the concrete composition is sand having a coefficient of variation of less than 35%, preferably less than 30%, preferably less than 25%, preferably less than 20%, preferably less than 15%, preferably less than 10%. In a preferred embodiment, the fine aggregate of the concrete composition is sand having a particle size distribution ranging from 10% of the average particle size to 200% of the average particle size, preferably 50-150%, preferably 75-125%, preferably 80-120%, preferably 90-110%.

In one embodiment, the sand comprises 80-95 wt % of silicon dioxide ($SiO_2$ or silica) relative to the total weight of the sand, preferably 85-94 wt %, preferably 88-93 wt %, preferably 90-92 wt % of $SiO_2$ relative to the total weight of the sand. The most common constituent of sand is silicon dioxide ($SiO_2$ or silica), usually in the form of quartz, which due to its chemical inertness and considerable hardness, is the most common mineral resistant to weathering. In a preferred embodiment, the wet concrete slurry of the present disclosure comprises sand as fine aggregate and the sand further comprises ferric oxide ($Fe_2O_3$), aluminum oxide ($Al_2O_3$), magnesium oxide (MgO), and potassium oxide ($K_2O$). These compounds are generally present in less than 5 wt % relative to the total weight of the sand, preferably less than 4 wt %, preferably less than 3 wt %, such as, for example, 0.1-2.0 wt %, preferably 0.2-1.0 wt %, preferably 0.4-0.9 wt % relative to the total weight of the sand. Other impurities may be present in the sand including, but not limited to limestone, gypsum, sand stone, feldspar, granite, magnetite, chlorite, glauconite, basalts, iron, obsidian and the like or mixtures thereof.

In one embodiment, the wet cement slurry may comprise other fine aggregates. Exemplary suitable fine aggregates that may be used in addition to, or in lieu of sand or dune sand include, but are not limited to, mineral particles of natural or synthetic origin, pumice, expanded clays, expanded schists, expanded glasses, expanded aggregates based on marble, granite, slate, ceramic, and the like and mixtures thereof.

The wet concrete slurry of the present disclosure also comprises a coarse aggregate. In one embodiment, the coarse aggregate may have an average specific gravity of 0.2-2.8, preferably 0.3-2.6, preferably 0.5-2.2, preferably 0.8-2.0, preferably 1.2-1.8, preferably 1.4-1.6. In a preferred embodiment, wet concrete slurry comprises the coarse aggregate at a weight percentage of 5-40 wt %, preferably 10-35 wt %, more preferably 15-32 wt %, even more preferably 20-30 wt % relative to a total weight percent of the wet concrete slurry.

In one embodiment, the coarse aggregate comprises 10-100 wt % waste plastic pieces, preferably 20-90 wt %, more preferably 22-60 wt %, even more preferably about 25 wt % or about 50 wt % relative to a total weight of the coarse aggregate. In one embodiment, the coarse aggregate comprises 100 wt % waste plastic pieces, meaning that no other coarse aggregate is present.

In one embodiment, the waste plastic pieces comprise 20-100 wt %, preferably 40-100 wt %, more preferably 60-100 wt %, even more preferably 80-100 wt % polyethylene, relative to a total weight of the weight plastic pieces.

In one embodiment, the polyethylene may be ultra-high-molecular-weight polyethylene (UHMWPE), ultra-low-molecular-weight polyethylene (ULMWPE or PE-WAX), high-molecular-weight polyethylene (HMWPE), high-density polyethylene (HDPE), high-density cross-linked polyethylene (HDXLPE), cross-linked polyethylene (PEX or XLPE), medium-density polyethylene (MDPE), linear low-density polyethylene (LLDPE) low-density polyethylene (LDPE), very-low-density polyethylene (VLDPE), chlorinated polyethylene (CPE), or mixtures thereof. Preferably the polyethylene is HDPE or LDPE.

In one embodiment, the polyethylene of the present disclosure has an average molecular weight of 2-300 kDa, preferably 5-200 kDa, preferably 10-150 kDa, preferably 10-75 kDa, preferably 15-50 kDa, preferably 20-40 kDa. The degree of polymerization (DP) is defined as the number of monomeric units in a macromolecule or polymer. In one embodiment, the polyethylene of the present disclosure has a degree of polymerization in the range of 100-2500, preferably 150-1500, preferably 200-750, preferably 250-500.

In one embodiment, the waste plastic pieces may comprise other polymeric materials. Exemplary polymeric materials or plastic materials that may be used in addition to, or in lieu of polyethylene include, but are not limited to, polypropylene, polystyrene, polyvinyl chloride, polyvinylidene chloride, polyacrylonitrile, high impact polystyrene, acrylonitrile butadiene styrene, polyethylene/acrylonitrile butadiene styrene, polycarbonate/acrylonitrile butadiene styrene, acrylic polymers, polybutadiene, polyisoprene, polyacetylene, silicones, synthetic rubbers and the like and copolymers and mixtures thereof. In a preferred embodiment, the waste plastic pieces are post-consumer waste.

In one embodiment, the waste plastic pieces have a specific gravity of 0.80-1.20, preferably 0.85-1.10, more preferably 0.90-1.05, even more preferably 0.92-1.02. However, in some embodiments, the waste plastic pieces may have a specific gravity of less than 0.80 or greater than 1.20. Preferably, the waste plastic pieces have a water absorption of less than 0.25%, preferably less than 0.10%, preferably less than 0.05%, preferably less than 0.01%.

In one embodiment, the waste plastic pieces have a surface roughness, Ra, of 1-50 μm, preferably 20-40 μm, however, in some embodiments, the surface roughness may be greater than a Ra of 50 μm. In one embodiment, the waste plastic pieces have an RMS surface roughness of at least 100 nm, preferably at least 500 nm, more preferably at least 1 µm. Such surface roughness properties may be determined by AFM.

In a related embodiment, the method further comprises reshaping the waste plastic pieces by melting, extruding, and/or grinding. For instance, HDPE may be sourced from used or post-consumer products, including but not limited to milk jugs, detergent bottles, butter tubs, food containers, waste containers, drink bottles, and water pipes. In some embodiments, the plastics may be sorted based on color, thickness, or other properties. These materials may be shredded, cleaned, melted, pressed, rolled, extruded, pelletized, or ground into other shapes that may be more easily transported to a plant for being formed into recycled products. In an alternative embodiment, an expanded waste plastic may be used, for instance, expanded PET or PS.

In one embodiment, the waste plastic pieces may be treated with UV irradiation, corona discharge, ozone, oxygen plasma, or with some other process that changes the exterior surface of the waste plastic pieces. For instance, the treatment may increase a surface roughness and surface area by exfoliating or blistering, and the Ra or RMS surface roughness may increase by a factor of at least 1.1, preferably at least 1.4, more preferably by a factor of 1.6. This increased surface roughness may then increase the compressive strength of the structural lightweight concrete.

In a preferred embodiment of the invention, the waste plastic pieces are mixed with other solid components of the structural lightweight concrete, such as the Portland cement, fine aggregate, and/or coarse aggregate (if other than plastic) prior to mixing with water. First mixing one or more of the solid components of the structural lightweight concrete with the waste plastic particles forms a roughened or tempered waste plastic particle having greater affinity for the solid components present in the structural lightweight concrete. The waste plastic particles (coarse aggregate) are preferably added to the concrete mixture, in particular the Portland cement, separately from the fine aggregate and the water. In an even more preferred embodiment the Portland cement is heated to a temperature that is ±5° C. of the glass transition temperature of the material from which the waste plastic particles are made. Preferably, the temperature of the Portland cement powder is at least 1° C. more than the glass transition temperature of the material from which the waste plastic particles are made. In cases where the waste plastic particles comprise more than one thermoplastic material and the mixture of thermoplastic materials have different glass transition points, the Portland cement is heated to a temperature of ±5° C. of the glass transition temperature of the waste plastic component that is present in the greatest amount with respect to the total amount of the waste plastic materials.

Mixing the waste plastic particles with a Portland cement powder at a temperature that is more than the glass transition temperature of the waste plastic particles ensures good compatibility between the hydration structure that is formed when the hydraulic concrete composition is cured and the waste plastic particles. Mixing with Portland cement at a temperature greater than the glass transition temperature may embed Portland cement particles within the surface of the waste plastic particles. Later curing with water results in a cured hydration structure that extends into the waste plastic particles to a depth at which the Portland cement particle is embedded in the waste plastic particle. Alternately, Portland cement powder is better able to chemically modify the surface of the waste plastic particles when heated to a temperature above the glass transition temperature of the material from which the waste plastic particles are made. Chemical modification may include surface activation and bond formation between one or more Portland cement components and the waste plastic particle and/or compositions obtained by sharing a hydraulic Portland cement component.

In one embodiment, and the waste plastic pieces have an average longest dimension of 1-12 mm, preferably 2-11 mm, more preferably 3-10 mm. In one embodiment, the waste plastic pieces are in the form of granules, fibers, and/or flakes.

Figure 2A:
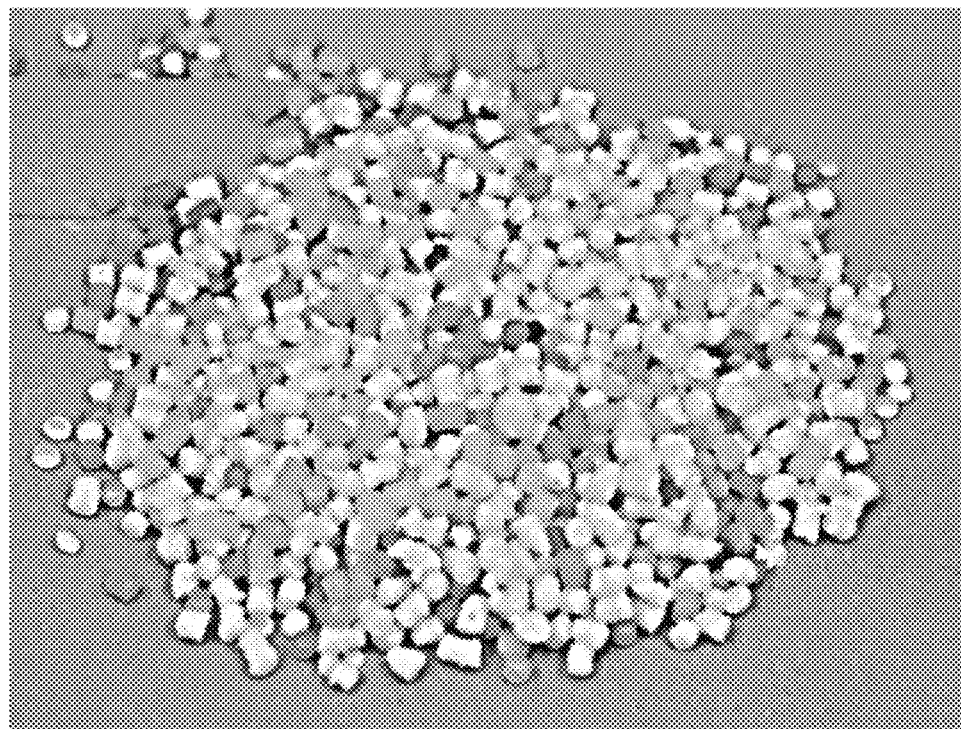
FIG. 2A is an image of granule-shaped recycled plastic.

In one embodiment, the waste plastic pieces may be in the form of granules having a cylindrical shape. In one embodiment, the granules may be reshaped from plastic by melting and extruding through a circular die. The extruded plastic may be cut perpendicular to its length after solidification to form the cylindrically-shaped granules. An example embodiment of such granules is shown in FIG. 2A. In one embodiment, the granules may have an average diameter of 1-4 mm, preferably 1.5-3 mm, or about 2 mm, and an average length of 1-7 mm, preferably 1.5-6, more preferably 2-5 mm. However, in some embodiments, the average diameter may be smaller than 1 mm or larger than 4 mm, or the average length may be shorter than 1 mm or longer than 7 mm.

Figure 2B:
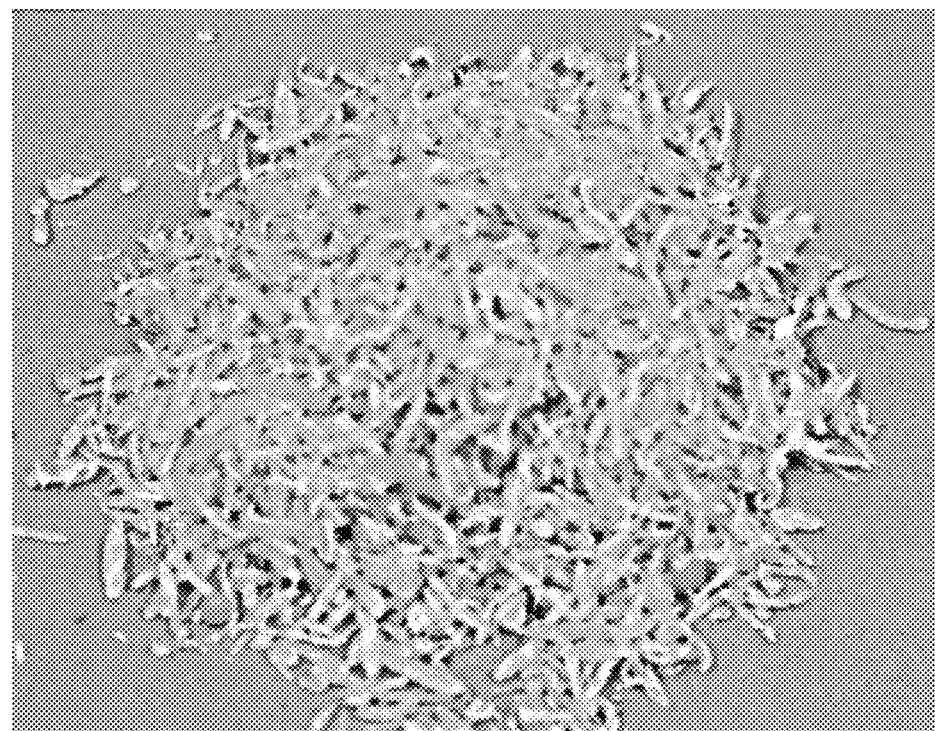
FIG. 2B is an image of fiber-shaped recycled plastic.
Figure 2C:
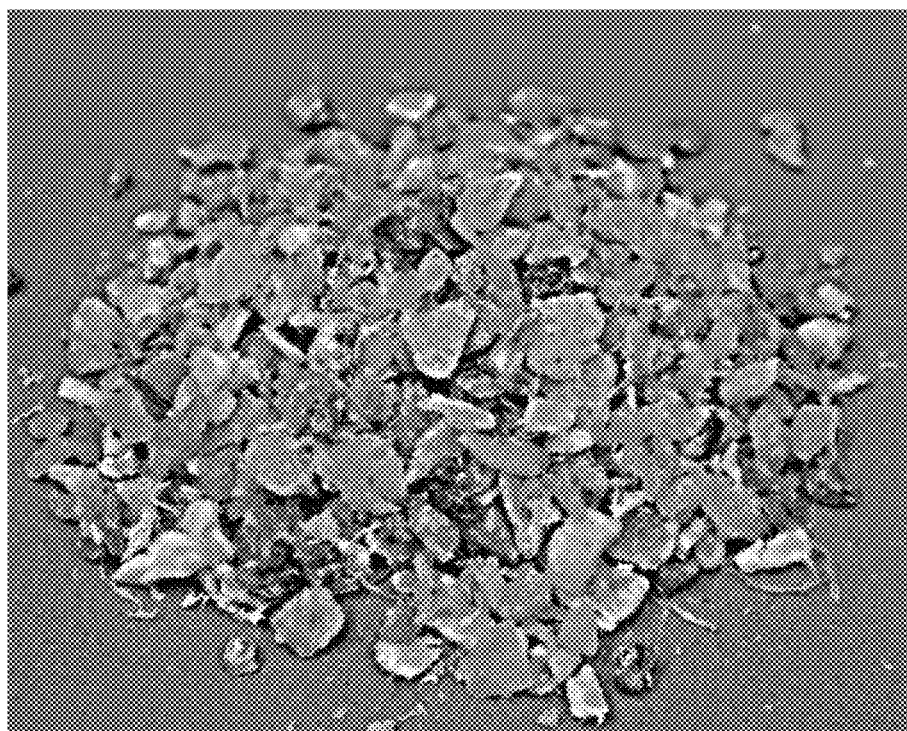
FIG. 2C is an image of white flake-shaped recycled plastic.
Figure 2D:
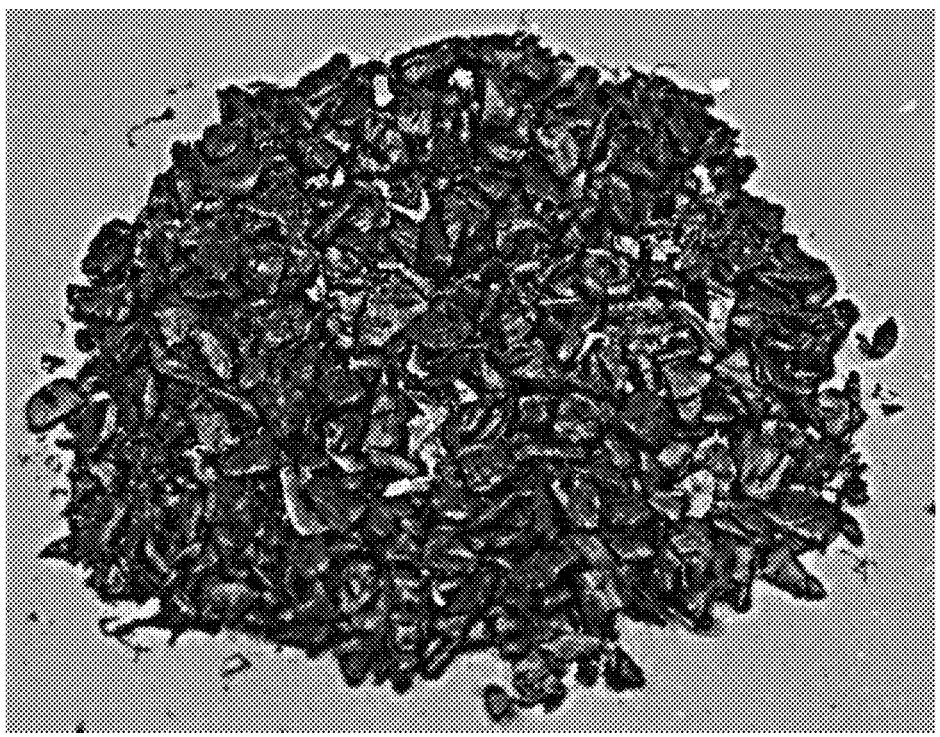
FIG. 2D is an image of black flake-shaped recycled plastic.

In one embodiment, the waste plastic pieces may be in the form of flakes, which may be obtained by grinding used plastic products. One embodiment of the flakes is shown in FIG. 2C, and another embodiment is shown in FIG. 2D. In general, the flakes are two dimensional, having a small thickness as compared to other dimensions. The flakes may also be considered as platelets. The flakes may have an average thickness of 0.3-0.8 mm, preferably 0.4-0.7 mm, and an average longest dimension of 1-8 mm, preferably 1.5-7 mm, more preferably 2-6 mm. However, in some embodiments, the waste plastic pieces may be in the form of flakes with an average thickness of less than 0.3 mm or greater than 0.8 mm, or an average longest dimension of shorter than 1 mm or longer than 8 mm.

In one embodiment, the waste plastic pieces are in the form of fibers, which may be obtained by mechanical grinding. The fibers have an elongated axis, and may resemble the shape of rice grains. FIG. 2B shows an embodiment of waste plastic pieces in the form of fibers. In one embodiment, the fibers having an average diameter of 0.2-0.8 mm, preferably 0.3-0.7 mm, more preferably 0.4-0.6 mm, or about 0.5 mm. The fibers may have an average length of 2-12 mm, preferably 2.5-11.5 mm, more preferably 3-10 mm. However, in some embodiments, the fibers may have an average diameter of less than 0.2 mm or greater than 0.8 mm, and/or an average length of less than 2 mm or greater than 12 mm.

In other embodiments, waste plastic pieces may come in a variety of different shapes, such as strings, grains, bricks, rings, boxes, rods, balls, ellipsoids, spikes, drops, pillows, or some other shape. In one embodiment, different shapes of waste plastic pieces may be mixed with one another. For instance, a coarse aggregate may comprise 75 wt % limestone aggregate and 25 wt % flake and granule waste plastic pieces, relative to a total weight of the coarse aggregate. The waste plastic pieces may comprise a mixture having a flake to granule mass ratio of 1:10-10:1, preferably 1:5-5:1, more preferably 1:2-2:1.

In one embodiment, the waste plastic pieces may be regular in one or more dimensions, for instance, having a monodisperse diameter or length. As defined here, being monodisperse in a dimension means having a coefficient of variation or relative standard deviation, expressed as a percentage and defined as the ratio of the particle dimension standard deviation (σ) to the particle dimension mean (μ), multiplied by 100%, of less than 25%, preferably less than 10%, preferably less than 8%, preferably less than 6%, preferably less than 5%.

However, in other embodiments, the waste plastic pieces may be irregular in one or more dimensions, for instance, having a polydisperse diameter or length. A polydisperse dimension refers to a having a coefficient of variation or relative standard deviation, expressed as a percentage and defined as the ratio of the particle dimension standard deviation (σ) to the particle dimension mean (μ), multiplied by 100%, of greater than 50%, preferably more than 70%. In yet another embodiment, the waste plastic pieces may be simultaneously monodisperse in one dimension and polydisperse in another dimension.

In one embodiment, the coarse aggregate comprises waste plastic pieces and further comprises at least one selected from the group consisting of limestone, perlite, and scoria, at a weight percentage of 1-90 wt % relative to a total weight of the coarse aggregate.

In one embodiment, the coarse aggregate comprises limestone. As used herein, limestone refers to a sedimentary rock composed largely of the minerals calcite and aragonite, which are different crystal forms or polymorphs of calcium carbonate ($CaCO_3$). In a preferred embodiment, the limestone comprises at least 50 wt % calcium carbonate relative to the total weight of the calcium carbonate, preferably at least 55 wt %, preferably at least 60 wt %, preferably at least 70 wt %, preferably at least 80 wt % relative to the total weight of the calcium carbonate and up to 20 wt % silicon dioxide relative to the total weight of the calcium carbonate, preferably up to 18 wt %, preferably up to 16 wt %, preferably up to 12 wt %, preferably up to 10 wt % silicon dioxide relative to the total weight of the calcium carbonate. In certain embodiments, the limestone may contain at least a few wt % of other materials including, but not limited to, quartz, feldspar, clay minerals, pyrite, siderite, chert and other minerals, preferably less than 2 wt %, preferably less than 1 wt %, preferably less than 0.5 wt % relative to the total weight of the calcium carbonate. In a preferred embodiment, the coarse aggregate comprises limestone with an average particle size in the range of 1-20 mm, preferably 5-20 mm, preferably 5-15 mm, preferably 10-15 mm, preferably 11-14 mm, preferably 12-13 mm. In one embodiment, the specific gravity of the limestone may be 2.10-2.90, preferably 2.30-2.80, more preferably 2.50-2.70. In one embodiment, the water absorption of the limestone may be 0.1-4%, preferably 0.5-3%, more preferably 0.8-1.5%.

In one embodiment, the coarse aggregate comprises perlite. As used herein, perlite refers to an amorphous volcanic glass that has a relatively high water content, typically formed by the hydration of obsidian. It occurs naturally and has the unusual property of greatly expanding when heated sufficiently. The perlite of the present disclosure may refer to perlite or expanded perlite. Perlite softens when it reaches temperatures of 800-900° C. Water trapped in the structure of the material vaporizes and escapes, and this causes the expansion of the material to 7-16 times its original volume. In a preferred embodiment, the structural lightweight concrete of the present disclosure has a weight percentage of the coarse aggregate in the form of perlite ranging from 1-10% relative to the total weight of the composition, preferably 2-8%, preferably 3-7%, preferably 4-6% relative to the total weight of the structural lightweight concrete. In a preferred embodiment, the coarse aggregate comprises perlite with an average particle size of 1-10 mm, preferably 1.5-8 mm, preferably 2-6 mm, preferably 2.5-5 mm, preferably 3-4 mm. In a preferred embodiment, the coarse aggregate is perlite comprising 65-80 wt % $SiO_2$, preferably 70-75 wt % $SiO_2$ relative to the total weight of the perlite, 10-18 wt % $Al_2O_3$, preferably 12-15 wt % $Al_2O_3$ relative to the total weight of the perlite, 2-5 wt % $Na_2O$, preferably 3-4 wt % $Na_2O$ relative to the total weight of the perlite, and 2-6 wt % $K_2O$, preferably 3-5 wt % $K_2O$ relative to the total weight of the perlite. In certain embodiments, the perlite comprises various elements including, but not limited to calcium, iron, magnesium, and oxides thereof in less than 2 wt % relative to the total weight of the perlite, preferably less than 1 wt % relative to the total weight of the perlite.

In a preferred embodiment, the coarse aggregate comprises scoria. As used herein, "scoria" or "cinder" refers to a highly vesicular (pitted with many cavities or vesicles), dark colored volcanic rock that may or may not contain crystals (phenocrysts). It is typically dark in color (generally dark brown, black or purplish red) and basaltic or andesitic in composition. Scoria is relatively low in density as a result of its numerous macroscopic ellipsoidal vesicles. The holes or vesicles form when gasses that were dissolved in the magma come out of solution as it erupts, creating bubbles in the molten rock, some of which are frozen in place as the rock cools and solidifies. Scoria differs from pumice, another vesicular volcanic rock, in having larger vesicles and thicker vesicle walls, and hence a higher density. In a preferred embodiment, the coarse aggregate comprises scoria with an average particle size of 1-30 mm, preferably 2-25 mm, preferably 3-20 mm, preferably 4-15 mm, preferably 4-10 mm.

In certain embodiments, the coarse aggregate comprises mixtures of waste plastic pieces, limestone, perlite, and scoria, mixtures of waste plastic pieces, perlite, and scoria, mixtures of waste plastic pieces, limestone, and scoria, and mixtures of waste plastic pieces, limestone, and perlite. In certain embodiments, the coarse aggregate comprises 30-80 wt % limestone relative to the total weight of the coarse aggregate, preferably 40-77 wt %, preferably 50-75 wt % limestone relative to the total weight of the coarse aggregate. In certain embodiments, the coarse aggregate comprises 10-30 wt % limestone relative to the total weight of the coarse aggregate. In certain embodiments, the coarse aggregate comprises 30-90 wt % scoria relative to the total weight of the coarse aggregate, preferably 33-50 wt %, preferably 35-45 wt % scoria relative to the total weight of the coarse aggregate. In certain embodiments, the coarse aggregate comprise 10-25 wt % perlite relative to the total weight of the coarse aggregate, preferably 11-22 wt %, preferably 15-20 wt % perlite relative to the total weight of the coarse aggregate.

It is equally envisaged that the structural lightweight concrete of the present disclosure may be adapted to comprise other coarse aggregates. Exemplary coarse aggregates that may be used in addition to, or in lieu of limestone, scoria, and/or perlite include, but are not limited to, pumice, shale, clays, slate, expanded clays, vermiculite, diatomite, schists, expanded schist, and the like, and mixtures thereof.

In one embodiment, the wet concrete slurry further comprises 0.1-2.0 wt %, preferably 0.1-1.0 wt %, more preferably 0.2-0.8 wt % of a superplasticizer relative to a total weight of the wet concrete slurry. Chemical admixtures refer to materials in the form of powder or fluids that are added to the concrete to give it certain characteristics not obtainable with plain concrete mixes. In certain embodiments, admixtures may be added to the concrete at the time of batching and/or mixing. As used herein, a "superplasticizer" or "high range water reducer" refers to a type of chemical admixture used where a well-dispersed particle suspension is required. These polymers are used as dispersants to avoid particle segregation and to improve the flow characteristics of suspensions such as in concrete applications. As used herein, a "plasticizer" or "dispersant" is an additive that increases the plasticity or fluidity of a material. Plasticizers increase the workability of "fresh" concrete, allowing it to be placed more easily, with less consolidating effort. A superplasticizer refers to a class of plasticizers that have fewer deleterious effects and can be used to increase workability more than is practical with traditional plasticizers. The addition of a superplasticizer to concrete or mortar allows the reduction of the water content and water to cement ratio, while not affecting the workability of the mixture. This effect drastically improves the performance of the hardening fresh paste, the strength of concrete increases when the water to cement ratio decreases. Such treatment improves the strength and durability characteristics of the concrete and enables the production of self-consolidating concrete and high performance concrete.

In one embodiment, the superplasticizer is a polycarboxylate, such as for example a polycarboxylate derivative with polyethylene oxide side chains, preferably the superplasticizer is a polycarboxylate ether (PCE) superplasticizer, such as for example the commercially-available GLENIUM 51®. Polycarboxylate ether-based superplasticizers allow a significant water reduction at a relatively low dosage as a result of their chemical structure which enables good particle dispersion. Polycarboxylate ether-based superplasticizers are composed of a methoxy-polyethylene glycol copolymer (side chain) grafted with methacrylic acid copolymer (main chain). The carboxylate group ($COO^-Na^+$) dissociates in water, providing a negative charge along the polycarboxylate ether backbone. The polyethylene oxide (PEO or MPEG) group affords a non-uniform distribution of the electron cloud, which gives a chemical polarity to the side chains. The number and the length of side chains are flexible parameters that are easy to change. When the side chains have a large amount of ethylene oxide units, the high molar mass lowers the charge density of the polymer, which decreases performance in cement suspensions. To balance both parameters, long side chain and high charge density, it is often necessary to keep the number of main chain units much higher than the number of side chain units. The negatively charged polycarboxylate ether backbone permits adsorption onto positively charged cations in a cement water system. The adsorption of the polymer and its $COO^-$ groups changes the zeta potential of the suspended cement particles yielding electrostatic repulsion forces and steric hindrance.

In one embodiment, other superplasticizers may be mixed in the wet cement slurry. Exemplary superplasticizers that may be used in addition to, or in lieu of a poly carboxylate ether based superplasticizer include, but are not limited to, alkyl citrates, sulfonated naphthalene, sulfonated alene, sulfonated melamine, lignosulfonates, calcium lignosulfonate, naphthalene lignosulfonate, poly naphthalene sulfonates, formaldehyde, sulfonated naphthalene formaldehyde condensate, acetone formaldehyde condensate, poly melamine sulfonates, sulfonated melamine formaldehyde condensate, polycarbonate, other poly carboxylates, other poly carboxylate derivatives comprising polyethylene oxide side chains, and the like and mixtures thereof.

The wet concrete slurry of the present disclosure also comprises water. In one embodiment, the dry ingredients may be mixed with each other before mixing with the water. Cement sets when mixed with water by way of a complex series of chemical reactions. The different constituents slowly crystallize and the interlocking of their crystals gives cement its strength. Carbon dioxide is slowly absorbed to convert the Portlandite ($Ca(OH)_2$) into soluble calcium carbonate. When water is mixed with cement, the product sets in a few hours and hardens over a period of weeks. These processes can vary widely depending on the mix used and the conditions of curing the product. After the initial setting, immersion in warm water will speed up setting; in some embodiments gypsum may be added as an inhibitor to prevent flash setting. In principle, the strength continues to rise slowly as long as water is available for continued hydration, but concrete is usually allowed to dry out after a few weeks causing strength growth to stop. In one embodiment, the wet concrete slurry has a weight percentage of water ranging from 5-12 wt % relative to the total weight of the slurry, preferably 6-11 wt %, more preferably 7-10 wt %. However, in some embodiments, the wet concrete slurry may comprise more than 12 wt % water.

In one embodiment, the wet cement slurry has a weight ratio of water to cement in the range of 0.33-0.8, preferably 0.33-0.75, preferably 0.33-0.70, preferably 0.33-0.65, preferably 0.33-0.6, preferably 0.33-0.55, preferably 0.35-0.50, preferably 0.375-0.45, or about 0.4 and is sufficient to affect curing of the cement. A lower water to cement ratio yields a stronger, more durable concrete, whereas more water gives a freer flowing concrete with a higher slump. Impure water can be used to make the concrete herein, but can cause problems when setting or in causing premature failure of the structure. In a preferred embodiment, the water of the structural lightweight concrete of the present disclosure is potable water. However, in an alternative embodiment, a brine or salt water may be used in place of the water.

Additionally, concrete production is time sensitive, and thorough mixing is essential for the production of uniform high quality concrete. Equipment and methods should be capable of effectively mixing concrete materials containing the largest specified aggregate to produce uniform mixtures. Exemplary equipment includes, but is not limited to concrete drum mixer, a volumetric concrete mixer, or simple concrete mixer. There is a wide variety of equipment for processing concrete from hand tools to heavy industrial machinery. Whatever the equipment used the objective is to produce the desired material and ingredients must be properly mixed, placed, shaped and retained within the time constraints.

As used herein, "workability" refers to the ability of a fresh fluid concrete mix to fill the form/mold properly, optionally with vibration. Workability depends on water content, aggregate (shape and size distribution), cementitious content and level of hydration, it can be modified by the addition of a superplasticizer. Workability can be measured by the concrete slump test, a simplistic measure of the plasticity of a fresh batch of concrete following the ASTM C 143 or EN 12350-2 test standards. In one embodiment, slump is measured by filling an "Abram's cone" with a sample from a fresh batch of concrete. The cone is placed with the wide end down onto a level surface; it is then filled in three layers of equal volume, with each layer being tamped with a steel rod to consolidate the layer. When the cone is carefully lifted off, the enclosed material slumps a certain amount due to gravity. A relatively dry sample slumps less than a relatively wet sample.

In one embodiment, the superplasticizer is added at an amount to the wet cement slurry in order to maintain a slump of 50-150 mm, preferably 75-125 mm, preferably about 100 mm. In certain embodiments, one or more aggregates or a portion of one or more aggregates may be pre-wetted and/or saturated with water. In certain embodiments, a separate paste mixing method may be used where cement and water are mixed into a paste such as by a high speed shear type mixer before combining these materials with aggregates or additives, preferably at a water to cement ratio of less than 0.45, preferably less than 0.4, preferably less than 0.35. In certain embodiments, up to half the batch water may be added to the solid ingredients and this premix may be blended with the remaining batch water and superplasticizer in dosages to maintain optimal slump.

As used herein, casting refers to the process in which a fluid material (i.e. the concrete mixture) is poured into a mold, which contains a hollow cavity of the desired shape, and then allowed to solidify or cure. The solidified part is also known as a casting, which is ejected, demolded or broken out of the mold to complete the process. Concrete is prepared as a viscous fluid so that it may be poured into forms to give the concrete its desired shape. There are many different ways in which concrete formwork can be prepared, such as slip forming and steel plate construction or factory setting in the manufacturing of precast concrete products.

In certain embodiments, the method may further comprise curing procedures. Cement is hydraulic and water allows it to gain strength, curing allows calcium-silicate hydrate (C—S—H) to form. Hydration and hardening of concrete is critical in the first 3 days, in approximately 4 weeks, typically over 90% of the final concrete strength is reached. During this period concrete must be kept under controlled temperature and humid atmosphere. In a preferred embodiment, this is achieved by spraying or ponding the concrete surfaces with water. In a preferred embodiment, the cast concrete products are demolded after greater than 6 hours, preferably greater than 12 hours, preferably greater than 24 hours and submerged in a curing chamber (or water tank) maintaining at least 50% humidity, preferably at least 75% humidity, preferably at least 90% humidity, preferably at least 100% humidity for greater than 7 days, preferably greater than 14 days, preferably greater than 28 days. In one embodiment, rather than submerging in a water tank, a demolded concrete may be covered with a wet cloth or wet burlap. In certain embodiments, the curing procedure may further comprise increases in temperature or pressure for intermittent periods of time depending on the desired properties of the cast concrete product.

As a construction material, concrete may be cast in almost any shape desired, and once hardened, can become a structural (load bearing) element. Concrete can be used in the construction of structural elements like panels, beams, pavements, street furniture, or may make cast in situ concrete for building superstructures like navigation locks, large mat foundations, large breakwaters, roads and dams. These may be supplied with concrete mixed on site, or may be provided with "ready mixed" concrete made at permanent mixing sites.

In one embodiment, the cast concrete product may be a concrete masonry unit. As used herein, a concrete masonry unit (CMU) also known as cinder block, hollow block, concrete brick, concrete block, cement block, besser block, or breeze block refers to a large rectangular block used in building construction. Concrete blocks may be produced with hollow centers (cores) to reduce weight or improve insulation. The use of blockwork allows structures to be built in the traditional masonry style with layers (or courses) of staggered blocks. Concrete blocks may come in many sizes, for example 350-450 mm by 180-220 mm by 100-200 mm. Concrete block cores are typically tapered so that the top surface of the block (as laid) has a greater surface area on which to spread a mortar bed. Most concrete masonry units have two cores, but three and four core units may also be produced. A core also allows for the insertion of steel reinforcement, tying individual blocks together in the assembly, aimed towards greatly increased strength. To hold the reinforcement in proper position and to bond the block to the reinforcement, the cores must be filled with grout (i.e. concrete). A variety of specialized shapes of concrete masonry units exist to allow special construction features. U-shaped blocks or knockout blocks may have notches to allow the construction of bond beams or lintel assemblies. Blocks with a channel on the end or "jamb blocks" allow doors to be secured to wall assemblies. Blocks with grooved ends permit the construction of control joints allowing a filler to be anchored between the block ends. Other features such as "bullnoses" may be incorporated. A wide variety of decorative profiles also exist.

Concrete blocks, when built in tandem with concrete columns and tie beams and reinforced with rebar, are a very common building material for the load bearing walls of buildings, in what is termed "concrete block structure" (CBS) construction. Houses typically employ a concrete foundation and slab with a concrete block wall on the perimeter. Large buildings typically use large amounts of concrete block; for even larger buildings, concrete blocks supplement steel I-beams. Concrete masonry can be used as a structural element in addition to being used as an architectural element. Ungrouted, partially grouted, and fully grouted walls are all feasible. Reinforcement bars can be used both vertically and horizontally inside the concrete masonry unit to strengthen the wall and result in better structural performance.

In certain embodiments, the structural lightweight concrete of the present disclosure may further comprise one or more additional chemical admixtures. Exemplary additional chemical admixtures include, but are not limited to, accelerators, retarders, air entraining agents, pigments, corrosion inhibitors, bonding agents, pumping aids and the like. Accelerators speed up the hydration (hardening) of concrete and may be especially useful for modifying the properties of concrete in cold weather. Exemplary accelerators include, but are not limited to, $CaCl_2$, $Ca(NO_3)_2$ and $NaNO_3$. Retarders, such as polyol retarders, slow the hydration of concrete and may be used in large or difficult pours where partial setting before the pour is complete is undesirable. Exemplary retarders include, but are not limited to, sugar, sucrose, sodium gluconate, glucose, citric acid, tartaric acid and the like. Air entraining agents (i.e. surfactants) add and entrain air bubbles in the concrete, which reduces damage during freeze-thaw cycles, increasing durability. Entrained air entails a reduction in strength and if too much air becomes trapped in the mixing defoamers may be used to encourage the agglomeration of air bubbles causing them to rise to the surface and disperse. Pigments may be used to change the color of the concrete, for aesthetics. Corrosion inhibitors may be used to minimize the corrosion of metal (i.e. steel) that may be used as reinforcement in the concrete. Bonding agents (typically a polymer) may be used to create a bond between old and new concrete with wide temperature tolerance and corrosion resistance. Pumping aids improve pumpability, thicken the paste and reduce separation and bleeding.

In certain embodiments, the structural lightweight concrete of the present disclosure may further comprise a viscosifying agent to modify the rheological properties of the composition. Exemplary viscosifying agents include, but are not limited to, cellulose ethers, polysaccharides, hydroxyalkylcelluloses, hydroxyethylcelluloses, methylcellulose, carboxymethylcellulose, hydroxyethylcellulose or ethylhydroxyethylcellulose, polyethylene oxides, polyvinyl alcohols, polyamides and the like or mixtures thereof.

In certain embodiments, the structural lightweight concrete of the present disclosure may further comprise one or more additional reinforcements. Concrete is strong in compression, as the aggregate efficiently carries the compression load. However, it is weak in tension as the cement holding the aggregate in place can crack, allowing the structure to fail. Reinforced concretes may add exemplary materials including, but not limited to, steel reinforcing bars, steel fibers, glass fibers, carbon fibers, carbon nanofibers, plastic fibers and the like or mixtures thereof to aid in carrying tensile loads.

In one embodiment, the structural lightweight concrete does not comprise fly ash. In one embodiment, the wet concrete slurry consists of only Portland cement, sand (fine aggregate), limestone (coarse aggregate), waste plastic pieces (coarse aggregate), and water. In a related embodiment, the wet concrete slurry consists of only Portland cement, sand, limestone, waste plastic pieces, water, and superplasticizer. In a related embodiment, the wet concrete slurry consists of only Portland cement, sand, waste plastic pieces, and water.

As used herein, compressive strength is the capacity of a material or structure to withstand loads tending to reduce size, as opposed to tensile strength, which withstands loads tending to elongate. In other words, compressive strength resists compression (being pushed together), whereas tensile strength resists tension (being pulled apart). Compressive strength can be measured by plotting applied force against deformation in a testing machine, such as a universal testing machine. Preferably, a concrete needs a compressive strength of at least 20 MPa to be considered a structural concrete. In one embodiment, the structural lightweight concrete of the present disclosure may have a compressive strength of 20-40 MPa, preferably 24-36 MPa, more preferably 26-34 MPa. However, in some embodiments, the structural lightweight concrete may have a compressive strength of less than 20 MPa, or greater than 40 MPa. In one embodiment, the structural lightweight concrete obtains the compressive strength as those mentioned previously when the wet concrete slurry is left to set or cure for 7-40 days, preferably 14-30 days, however, in some embodiments, the compressive strengths may be obtained in under 7 days or over 40 days of setting.

As used herein, thermal conductivity is the property of a material to conduct heat or alternatively the ability of a material to absorb heat. It can also be defined as the quantity of heat transmitted through a unit thickness of a material due to a unit temperature or the ratio between the heat flux and the temperature gradient. Heat transfer occurs at a lower rate across materials of low thermal conductivity than across materials of high thermal conductivity. Correspondingly, materials of high thermal conductivity are widely used in heat sink applications and materials of low thermal conductivity are used as thermal insulation. The SI units for thermal conductivity is measured in watts per meter Kelvin (W/(m·K)). The conductivity of concrete depends on its composition. In a preferred embodiment, the structural lightweight concrete of the present disclosure in any of its embodiments has a thermal conductivity in the range of 0.50-1.10 W/(m·K), preferably 0.52-1.02 W/(m·K), preferably 0.60-1.00 W/(m·K), preferably 0.65-0.95 W/(m·K), preferably 0.67-0.93 W/(m·K), preferably 0.68-0.92 W/(m·K). However, in some embodiments, the thermal conductivity may be less than 0.50 W/(m·K) or greater than 1.10 W/(m·K). In one embodiment, the structural lightweight concrete obtains a thermal conductivity as those mentioned previously when the wet concrete slurry is left to set or cure for 7-40 days, preferably 14-30 days, however, in some embodiments, the thermal conductivity may be obtained in under 7 days or over 40 days of setting. In a preferred embodiment, the structural lightweight concrete of the present disclosure in any of its embodiments has a thermal conductivity that is up to 80% less than the thermal conductivity of a normal weight concrete composition, preferably up to 70%, preferably up to 60%, preferably up to 55%, preferably up to 50%, preferably up to 45%, preferably up to 40% less than the thermal conductivity of a normal weight concrete composition. In one embodiment, the structural lightweight concrete may be considered a "thermal insulating concrete" due to its low thermal conductivity compared with a normal weight concrete, which may have a thermal conductivity of about 1.7 W/(m·K). A structural lightweight thermal insulating concrete may use the abbreviation SLWTIC. In one embodiment, the structural lightweight concrete has both a compressive strength of 20-40 MPa and a thermal conductivity of 0.50-1.10 W/(m·K).

As used herein, unit weight (y, also known as specific weight) is the weight per unit volume of a material. The unit weight of structural lightweight concrete of the present disclosure will vary depending on the composition of the aggregates and the unit weights of the constituent aggregates. In a preferred embodiment, the structural lightweight concrete of the present disclosure in any of its embodiments has a unit weight in the range of 1,400-2,000 kg/m$^3$, preferably 1,450-1,800 kg/m$^3$, more preferably 1,500-1,700 kg/m$^3$. However, in some embodiments, the unit weight may be lower than 1,400 kg/m$^3$, or greater than 2,000 kg/m$^3$. In one embodiment, the structural lightweight concrete obtains a unit weight as those mentioned previously when the wet concrete slurry is left to set or cure for 7-40 days, preferably 14-30 days, however, in some embodiments, the unit weight may be obtained in under 7 days or over 40 days of setting.

The examples below are intended to further illustrate protocols for preparing, characterizing and using the structural lightweight concrete, and are not intended to limit the scope of the claims.

Example 1

Materials and Evaluation

The developmental work was executed in three major stages. The first stage involved selection and acquisition of recycled plastics and chemical admixtures, and designing of trial mixtures. In the second stage, mixture proportions for the properties of structural lightweight thermally insulated concrete (SLWTIC) were obtained by preparing several trial mixtures and measuring their strength and unit weight. In the third phase, specimens were prepared from the mixture proportions obtained from the trials in the second stage. The prepared specimens were then tested to assess their mechanical and thermal properties.

The following materials were utilized in the preparation of SLWTIC mixtures:
  i. Portland cement
  ii. Coarse aggregates (crushed limestone)
  iii. Recycled plastic aggregates
  iv. Fine aggregate (desert sand)

v. Superplasticizer vi. Water

ASTM C 150 Type I cement with a specific gravity of 3.15 was utilized in all the mixtures. The chemical composition of the cement is shown in Table 1.

TABLE 1

Chemical composition of cement.

| Constituent | Weight % |
|---|---|
| $SiO_2$ | 20.52 |
| $Fe_2O_3$ | 3.8 |
| $Al_2O_3$ | 5.64 |
| CaO | 64.35 |
| MgO | 2.11 |
| $Na_2O$ | 0.19 |
| $K_2O$ | 0.36 |
| $SO_3$ | 2.1 |
| Loss on ignition | 0.7 |
| Alkalis ($Na_2O + 0.658\ K_2O$) | 0.43 |
| $C_3S$ | 56.7 |
| $C_2S$ | 16.05 |
| $C_3A$ | 8.52 |
| $C_4AF$ | 11.56 |

Crushed limestone with a maximum size of 12.5 mm was used as coarse aggregate. The specific gravity of the coarse aggregate was 2.60 and the water absorption was 1.1%. The physical properties of the limestone aggregate are shown in Table 2, and the chemical composition is shown in Table 3.

TABLE 2

Physical properties of limestone aggregate.

| Property | Value |
|---|---|
| Specific gravity | 2.6 |
| Absorption (%) | 1.1-1.4 |
| Fineness Modulus | 3.23 |
| Unit weight (kg/m$^3$) | 1845 |
| Material finer than ASTM # 200 Sieve | 0.32% |
| Loss on Abrasion | 23.50% |
| Clay lumps and friable particles | 0.45% |

TABLE 3

Chemical composition of limestone aggregate.

| Constituent | Weight % |
|---|---|
| CaO | 54.97 |
| $SiO_2$ | 0.01 |
| $Al_2O_3$ | 0.17 |
| $Fe_2O_3$ | 0.05 |
| $SiO_2 + Al_2O_3 + Fe_2O_3$ (>=70) | 0.23 |
| MgO | 0.64 |
| Loss on ignition | 43.66 |

Recycled plastic obtained from a plastic recycling plant was used as coarse aggregate. The specific gravity of the recycled plastic aggregates was 0.95, and there was no water absorption.

The recycled plastic used in the disclosure is generally obtained by recycling the plastics used in the packaging applications. The packaging materials are usually manufactured from polyethylene (LDPE or HDPE). Consequently, the composition of the waste plastic depends on the source material used. The shape and size of the used recycled plastic (granule, flake, or fiber) are generally controlled by the recycling process.

Based on their shapes, the plastic aggregates were classified as granules, flakes, and fibers. FIGS. 2A-2D show the different types of recycled plastics used in this invention.

Recycled plastic granules were produced by chopping the extruded molten waste plastic after its solidification. The granules used in the disclosure are cylindrical in shape with a diameter of about 2 mm and 2-5 mm long.

Flakes were obtained from recycled waste plastic by mechanical grinding. They were of irregular size and shape, and predominantly two dimensional and thin. The length and width were in the range of 2-6 mm.

Fibers were also obtained by mechanical grinding of waste plastic. The diameter was about 0.5 mm and the length was in the range of 3 to 10 mm.

Desert sand with a specific gravity of 2.56 and water absorption of 0.6% was used as fine aggregate. The grading of fine aggregate is shown in Table 4.

TABLE 4

Grading of fine aggregate.

| ASTM Sieve # | Size opening (mm) | % passing |
|---|---|---|
| 4 | 4.75 | 100 |
| 8 | 2.36 | 100 |
| 16 | 1.18 | 100 |
| 30 | 0.600 | 76 |
| 50 | 0.300 | 10 |
| 100 | 0.0150 | 4 |

A superplasticizer (GLENIUM 51®) was added to the concrete mixtures to obtain the required slump of 100±25 mm. The dosage of the superplasticizer was between 0.4% to 1.6%, by weight of the cement. The properties of the superplasticizer are shown in Table 5.

Potable water was used in the preparation of all the mixtures and curing of the SLWTIC specimens.

TABLE 5

Technical data of superplasticizer (GLENIUM 51 ®).

| Property | Value |
|---|---|
| Appearance | Brown liquid |
| Specific gravity @ 20° C. | 1.08 ± 0.02 g/cm$^3$ |
| pH-value @ 20° C. | 7.0 ± 1.0 |
| Alkali content | ≤5.0 |
| Chloride content | ≤0.1% |

Example 2

SLWTIC Mixtures

SLWTIC mixtures were prepared with a cement content of 350 or 370 kg/m$^3$ and a water/cement (w/c) ratio of 0.4 or 0.45. SLWTIC mixtures were prepared with 25, 50, 75 or 100% recycled plastic aggregates by weight of total coarse aggregates in conjunction with conventional limestone aggregates. Desert sand was used as the fine aggregate. The quantity of superplasticizer was varied from 0.4% to 1.6%, by weight of cement, to obtain workable concrete mixtures.

The mixture constituents were mixed in a 0.7 m$^3$ concrete drum mixer for 2 to 3 minutes, and then about half of the water was added while the drum was still rotating until all the particles were wet. The measured quantity of the superplasticizer was added gradually to the remaining water that was then added to the mix. Mixing was continued until a uniform consistency was achieved. The mixed concrete was poured in molds of different sizes and shapes that are required for determining the mechanical properties and thermal properties of the developed SWLTIC. The filled molds were vibrated until a thin film of mortar appeared on the surface of the specimens. The specimens were covered, after casting, with a plastic sheet and left for 24 hours in a laboratory environment (22±3 OC) to minimize the loss of mix water. After 24 hours, the specimens were demolded and cured for 28 days by covering with wet burlap.

The descriptions and compositions of the concrete samples are shown in Tables 6 and 7, respectively.

TABLE 6

Description of concrete samples by Mix #.

| Mix # | Description |
|---|---|
| M1 | 25% Recycled Plastic Granules and 75% Limestone-350-0.45 |
| M2 | 25% Recycled Plastic Granules and 75% Limestone-370-0.40 |
| M3 | 50% Recycled Plastic Granules and 50% Limestone-350-0.45 |
| M4 | 50% Recycled Plastic Granules and 50% Limestone-370-0.40 |
| M5 | 75% Recycled Plastic Granules and 25% Limestone-350-0.45 |
| M6 | 75% Recycled Plastic Granules and 25% Limestone-370-0.40 |
| M7 | 100% Recycled Plastic Granules and 0% Limestone-350-0.45 |
| M8 | 100% Recycled Plastic Granules and 0% Limestone-370-0.40 |
| M9 | 25% Recycled Plastic Fibers and 75% Limestone-350-0.45 |
| M10 | 25% Recycled Plastic Fibers and 75% Limestone-370-0.40 |
| M11 | 50% Recycled Plastic Fibers and 50% Limestone-350-0.45 |
| M12 | 50% Recycled Plastic Fibers and 50% Limestone-370-0.40 |
| M13 | 25% Recycled Plastic Flakes and 75% Limestone-350-0.45 |
| M14 | 25% Recycled Plastic Flakes and 75% Limestone-370-0.40 |
| M15 | 50% Recycled Plastic Flakes and 50% Limestone-350-0.45 |
| M16 | 50% Recycled Plastic Flakes and 50% Limestone-370-0.40 |
| M17 | 75% Recycled Plastic Flakes and 25% Limestone-350-0.45 |
| M18 | 75% Recycled Plastic Flakes and 25% Limestone-370-0.40 |
| M19 | 100% Recycled Plastic Flakes and 0% Limestone-350-0.45 |
| M20 | 100% Recycled Plastic Flakes and 0% Limestone-370-0.40 |

TABLE 7

Weight percentage composition of concrete samples.

| Mix # | Cement, % | Total Water, % | Coarse aggregates Lime Stone, % | Coarse aggregates Plastic, % | Fine Aggregates Sand, % | Super Plasticizer, % |
|---|---|---|---|---|---|---|
| M1 | 16.4 | 7.9 | 22.6 | 7.5 | 45.3 | 0.2 |
| M2 | 17.2 | 7.4 | 22.5 | 7.5 | 45.1 | 0.2 |
| M3 | 18.2 | 8.6 | 14.6 | 14.6 | 43.8 | 0.2 |
| M4 | 19.1 | 8.1 | 14.5 | 14.5 | 43.6 | 0.3 |
| M5 | 19.9 | 9.3 | 7.1 | 21.2 | 42.3 | 0.3 |
| M6 | 20.8 | 8.7 | 7.0 | 21.1 | 42.1 | 0.3 |
| M7 | 21.4 | 9.9 | 0.0 | 27.3 | 41.0 | 0.3 |
| M8 | 22.5 | 9.2 | 0.0 | 27.2 | 40.8 | 0.3 |
| M9 | 16.4 | 7.9 | 22.6 | 7.5 | 45.3 | 0.2 |
| M10 | 17.2 | 7.4 | 22.5 | 7.5 | 45.1 | 0.2 |
| M11 | 18.2 | 8.6 | 14.6 | 14.6 | 43.8 | 0.2 |
| M12 | 19.1 | 8.1 | 14.5 | 14.5 | 43.6 | 0.3 |
| M13 | 16.4 | 7.9 | 22.6 | 7.5 | 45.3 | 0.2 |
| M14 | 17.2 | 7.4 | 22.5 | 7.5 | 45.1 | 0.2 |
| M15 | 18.2 | 8.6 | 14.6 | 14.6 | 43.8 | 0.2 |
| M16 | 19.1 | 8.1 | 14.5 | 14.5 | 43.6 | 0.3 |
| M17 | 19.9 | 9.3 | 7.1 | 21.2 | 42.3 | 0.3 |
| M18 | 20.8 | 8.7 | 7.0 | 21.1 | 42.1 | 0.3 |
| M19 | 21.4 | 9.9 | 0.0 | 27.3 | 41.0 | 0.3 |
| M20 | 22.5 | 9.2 | 0.0 | 27.2 | 40.8 | 0.3 |

Example 3

Evaluation of Properties

The 28-day unit weight and compressive strength of the developed SLWTIC were measured on 100 mm×100 mm×100 mm cube specimens.

The compressive strength was determined according to ASTM C39 after 28 days of curing. The load was applied at a rate of 3.0 kN/s until the failure of the specimen and the compressive strength was obtained by dividing the failure load by the area of cross section of the specimen.

A total of 54 (50 mm diameter×20 mm thick) concrete cylindrical disks were prepared to measure the thermal conductivity. A FOX 50 Heat Flow Meter was used for measuring the thermal conductivity according to ASTM C518 and ISO 8301. The FOX 50 provides rapid results in a compact footprint. This equipment is an ideal choice for the measurement of thermal conductivity of medium-conductivity materials, such as plastics, ceramics, glasses, composites, concrete, etc.

Three specimens from each mix were tested. Measurements were taken on both faces of each specimen; thus, six readings were obtained for each mixture, and the average of these readings was considered in the analysis.

The properties of the developed SWLTICs are discussed in the following examples.

Example 4

Specimens with Granule-Shaped Recycled Plastic Aggregates

Figure 3:
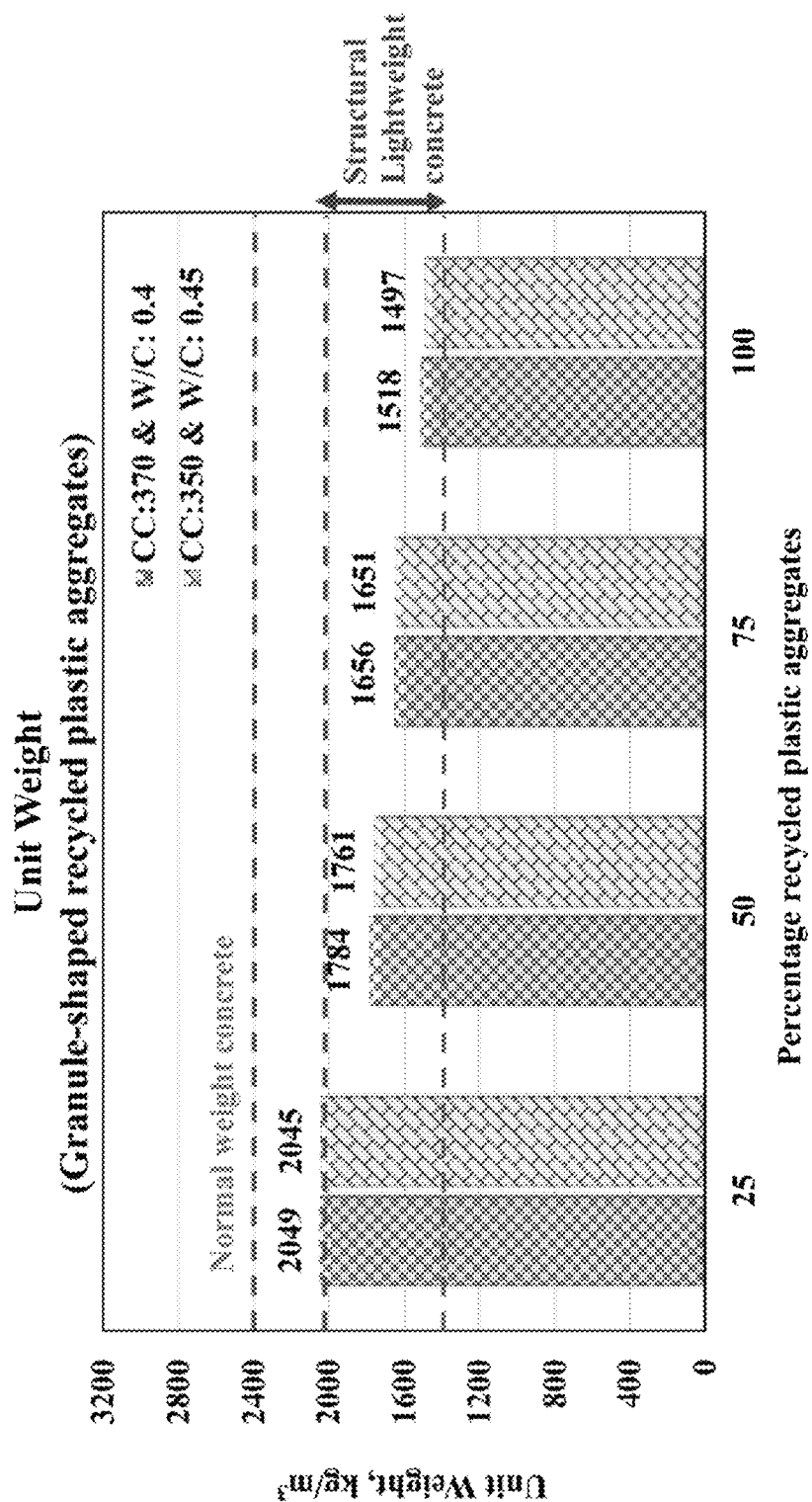
FIG. 3 is a graph showing the unit weights of SLWTIC specimens comprising different amounts of granule-shaped recycled plastics as a coarse aggregate.
Figure 4:
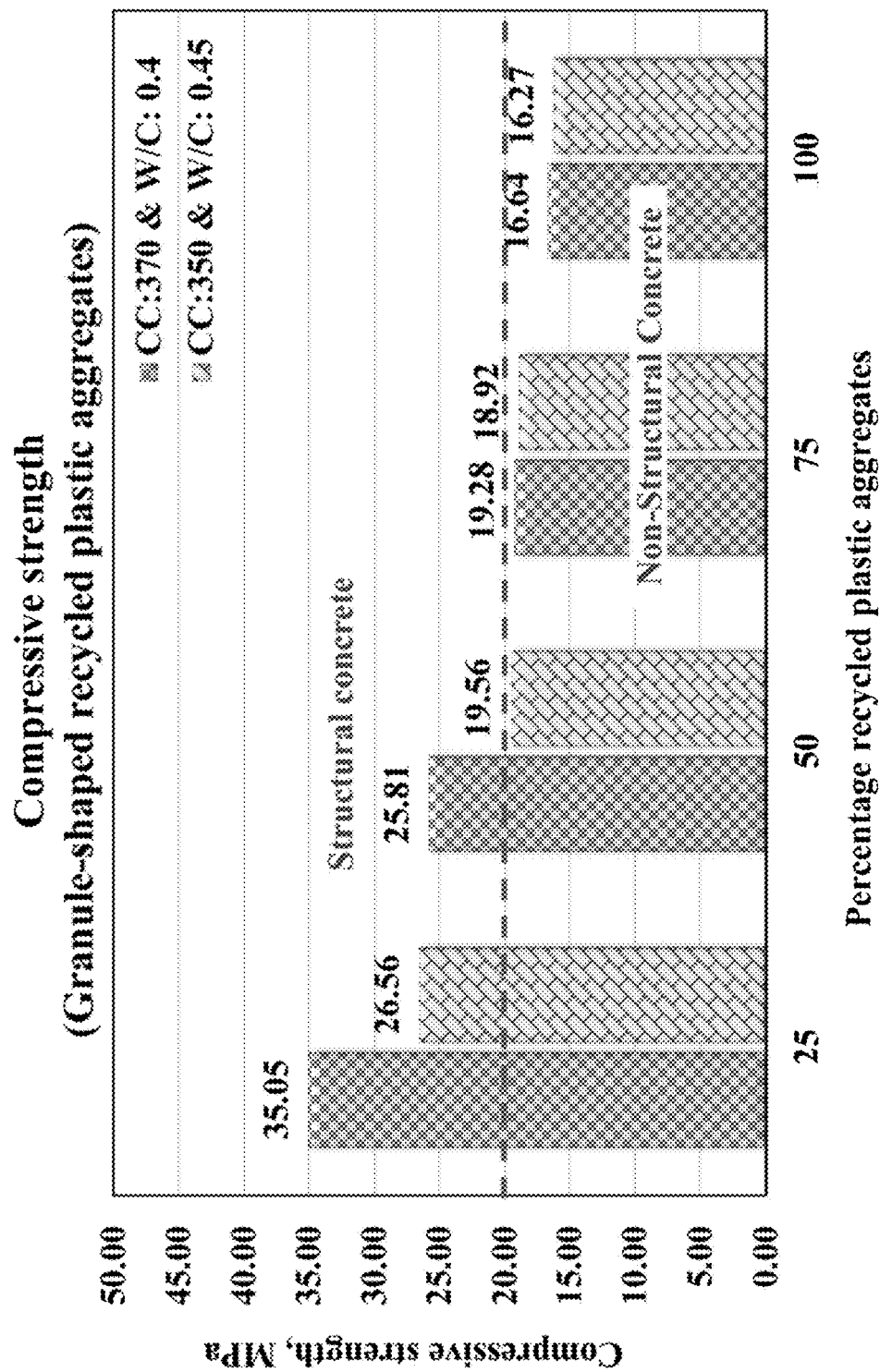
FIG. 4 is a graph of the compressive strengths of the SLWTIC specimens of FIG. 3.
Figure 5:
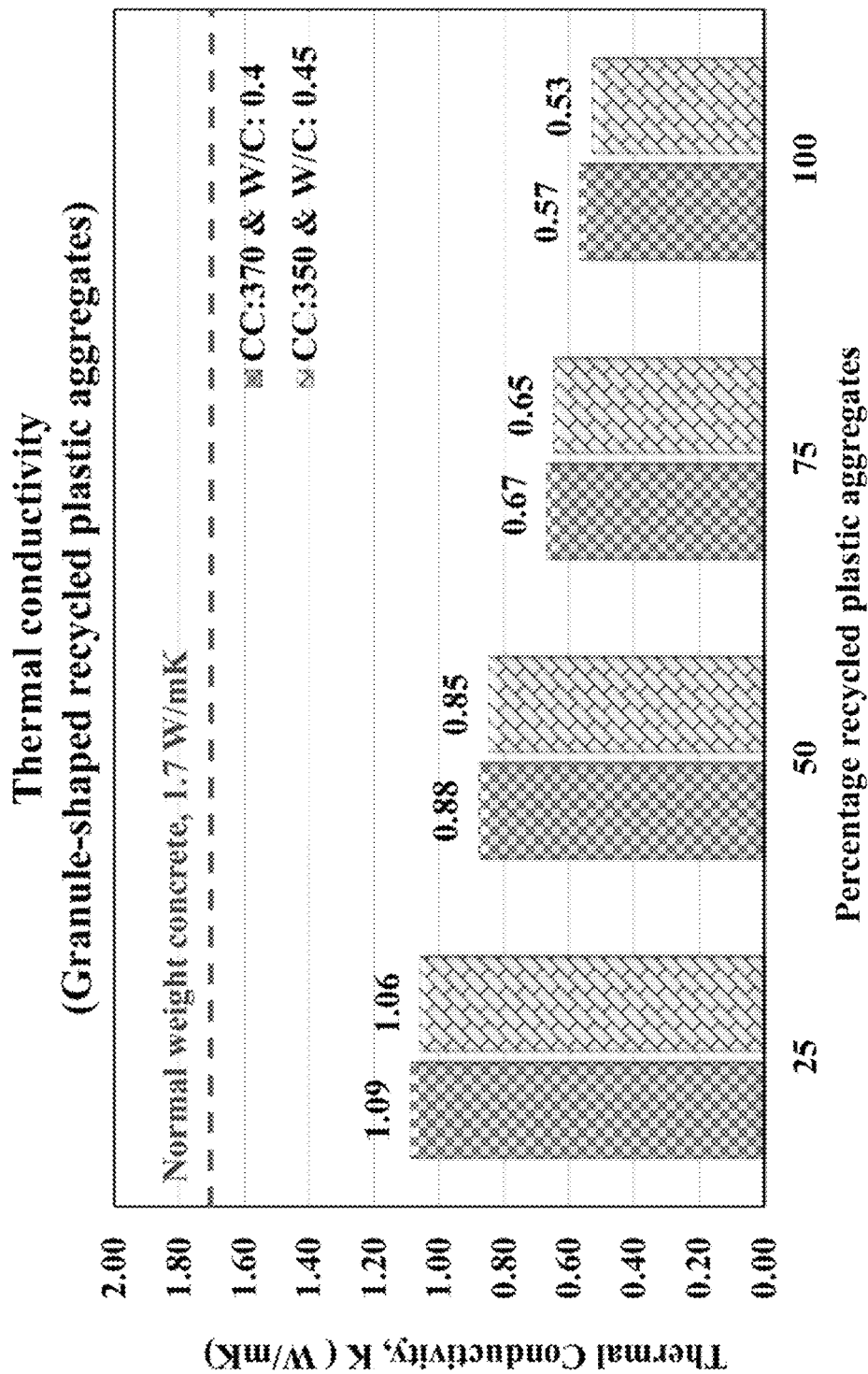
FIG. 5 is a graph showing the thermal conductivities of the SLWTIC specimens of FIG. 3.

Following is a listing of the properties of SLWTIC prepared with granule-shaped recycled plastic aggregates:
1. The unit weight was in the range of 1,497 kg/m$^3$ to 2,049 kg/m$^3$ as shown in FIG. 3. These values are within the specified limits for structural lightweight concrete (SLWC).
2. The compressive strength of the developed SLWTIC varied from 16.27 MPa to 35.05 MPa, as shown in FIG. 4. A compressive strength of more than 20 MPa was achieved in mixtures containing 25% and 50% of recycled plastic aggregates as the coarse aggregate. Thus, these mixtures can be used as structural concrete. However, mixtures with 75% and 100% recycled plastic aggregates exhibiting compressive strength of less than 20 MPa can be used as non-structural concrete.
3. The thermal conductivity of the developed SLWTIC was in the range of 0.53 W/(m·K) to 1.09 W/(m·K) (FIG. 5), which is low compared to the thermal conductivity of normal weight concrete (NWC), which is 1.7 W/(m·K). This makes the developed SLWTIC a highly desirable energy efficient material.

Example 5

Specimens with Fiber-Shaped Recycled Plastic Aggregates

Figure 6:
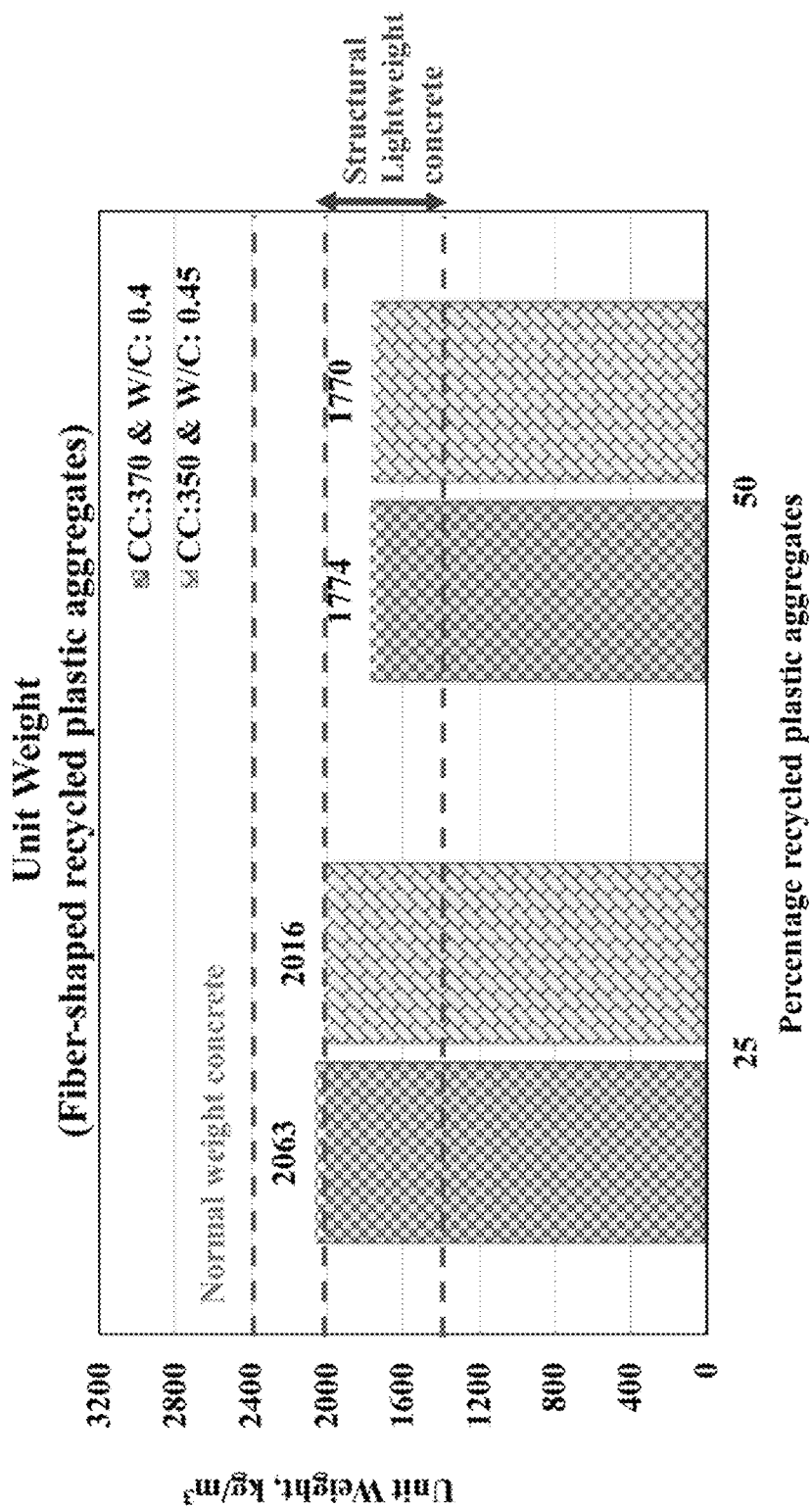
FIG. 6 is a graph showing the unit weights of SLWTIC specimens comprising different amounts of fiber-shaped recycled plastics as a coarse aggregate.
Figure 7:
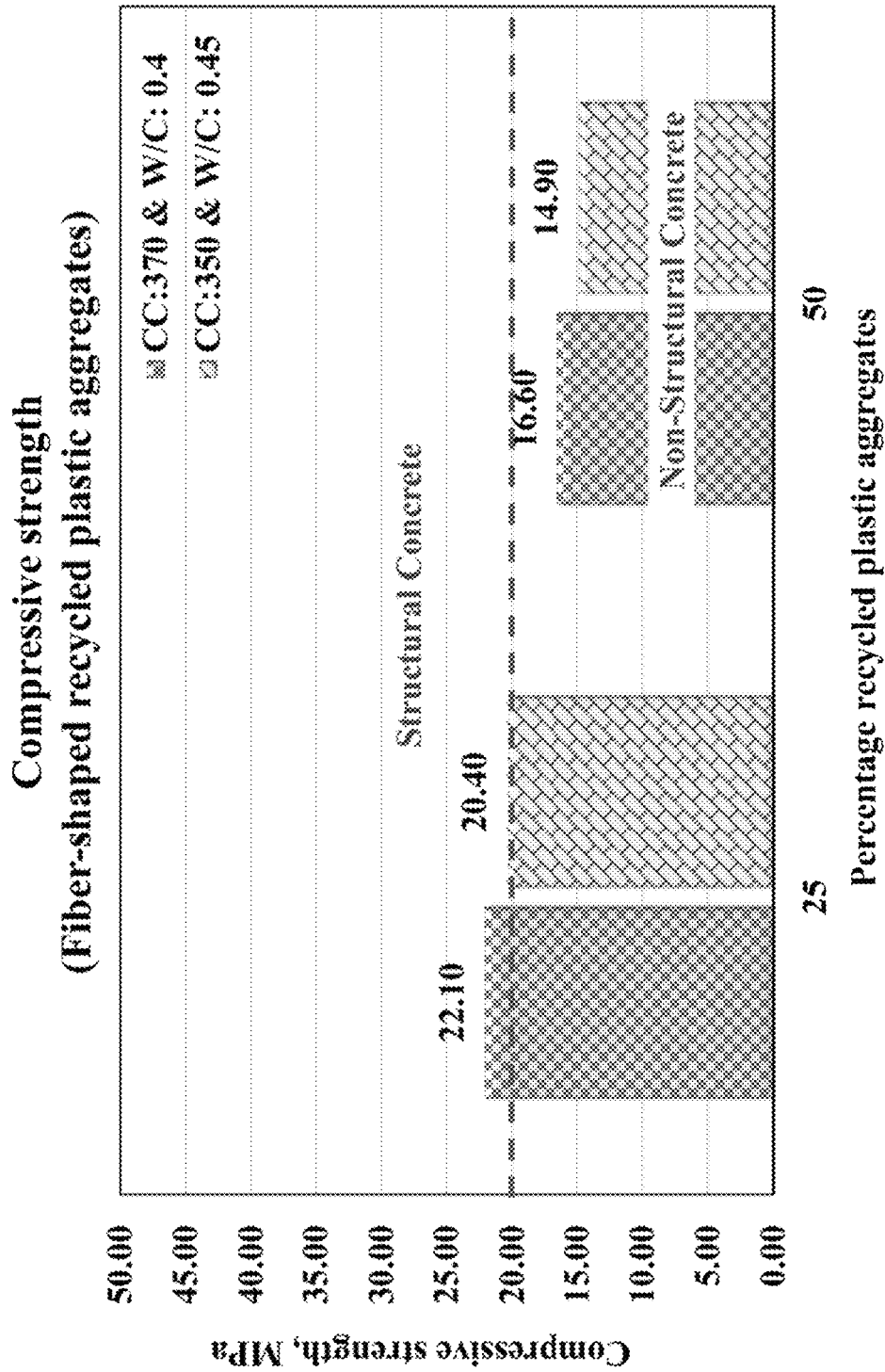
FIG. 7 is a graph of the compressive strengths of the SLWTIC specimens of FIG. 6.

Following is a listing of the properties of SLWTIC prepared with fiber-shaped recycled plastic aggregates:
1. The unit weight is in the range of 1,770 kg/m$^3$ to 2,063 kg/m$^3$, as shown in FIG. 6. These values are within the limits specified for SLWC.
2. The compressive strength of the developed SLWTIC is in the range of 14.90 MPa to 22.10 MPa, as shown in FIG. 7. A compressive strength of more than 20 MPa was achieved with the mixture containing 25% recycled plastic aggregates. Thus, this mixture can be used as structural lightweight concrete. However, mixture with 50% recycled plastic aggregates exhibiting a compressive strength of less than 20 MPa can be used as non-structural lightweight concrete.

Figure 8:
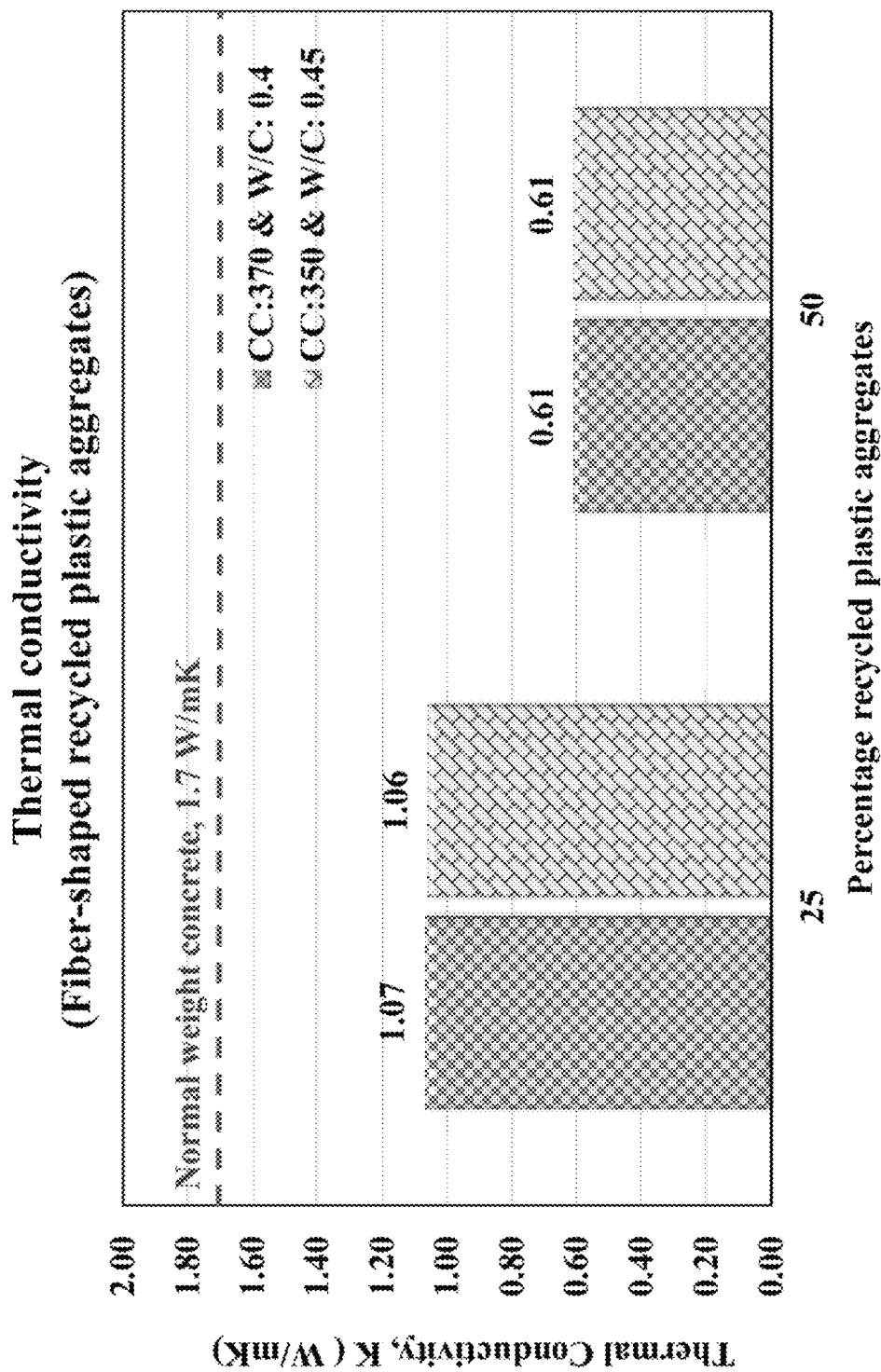
FIG. 8 is a graph showing the thermal conductivities of the SLWTIC specimens of FIG. 6.

3. The thermal conductivity of the developed SLWTIC was in the range of 0.61 W/(m·K) to 1.07 W/(m·K) (FIG. 8), which is low compared to the thermal conductivity of NWC which is 1.7 W/(m·K). This makes the developed SLWTIC a highly desirable energy efficient material.

Example 6

Specimens with Flake-Shaped Recycled Plastic Aggregates

Figure 9:
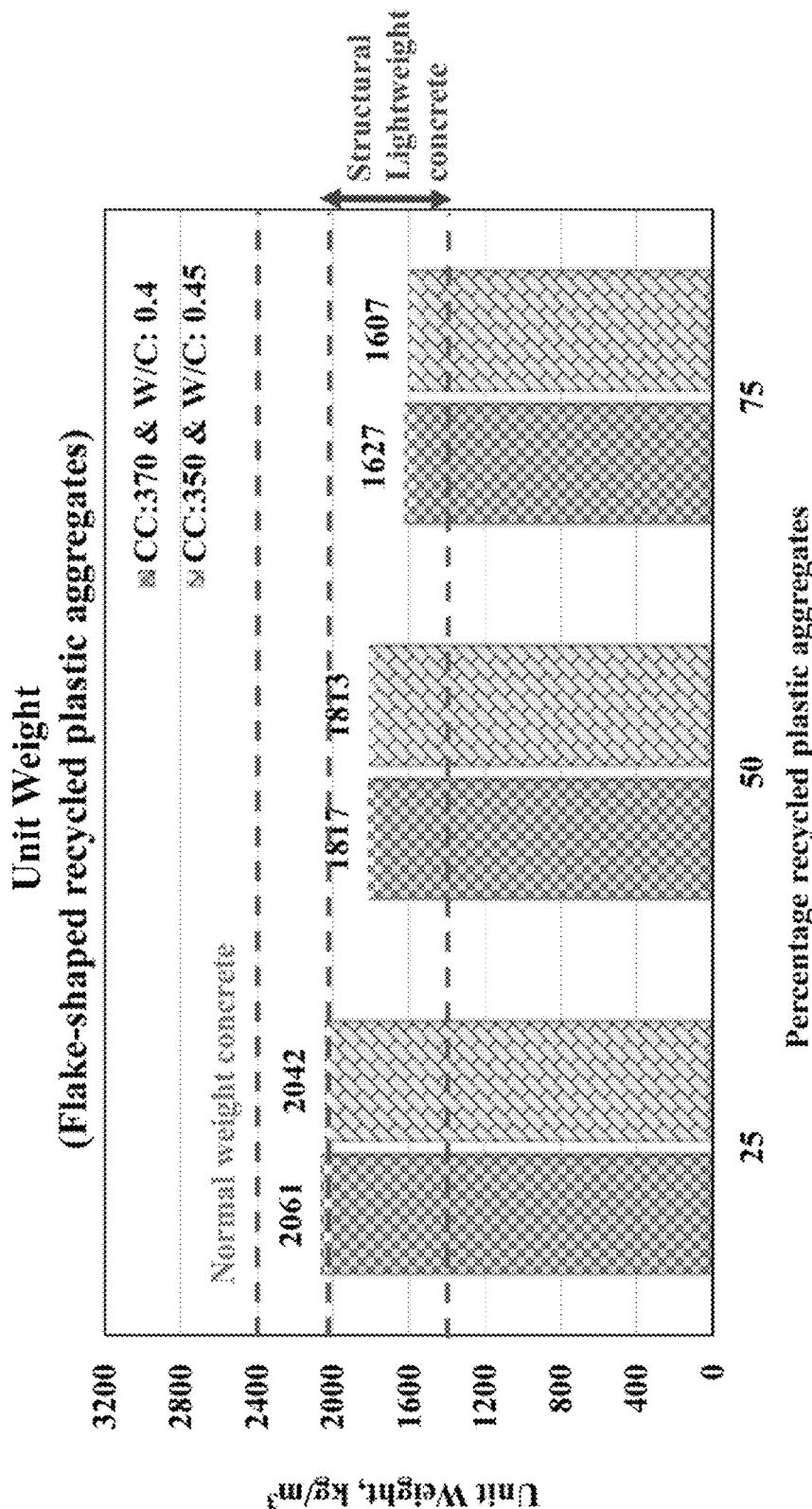
FIG. 9 is a graph showing the unit weights of SLWTIC specimens comprising different amounts of fiber-shaped recycled plastics as a coarse aggregate.
Figure 10:
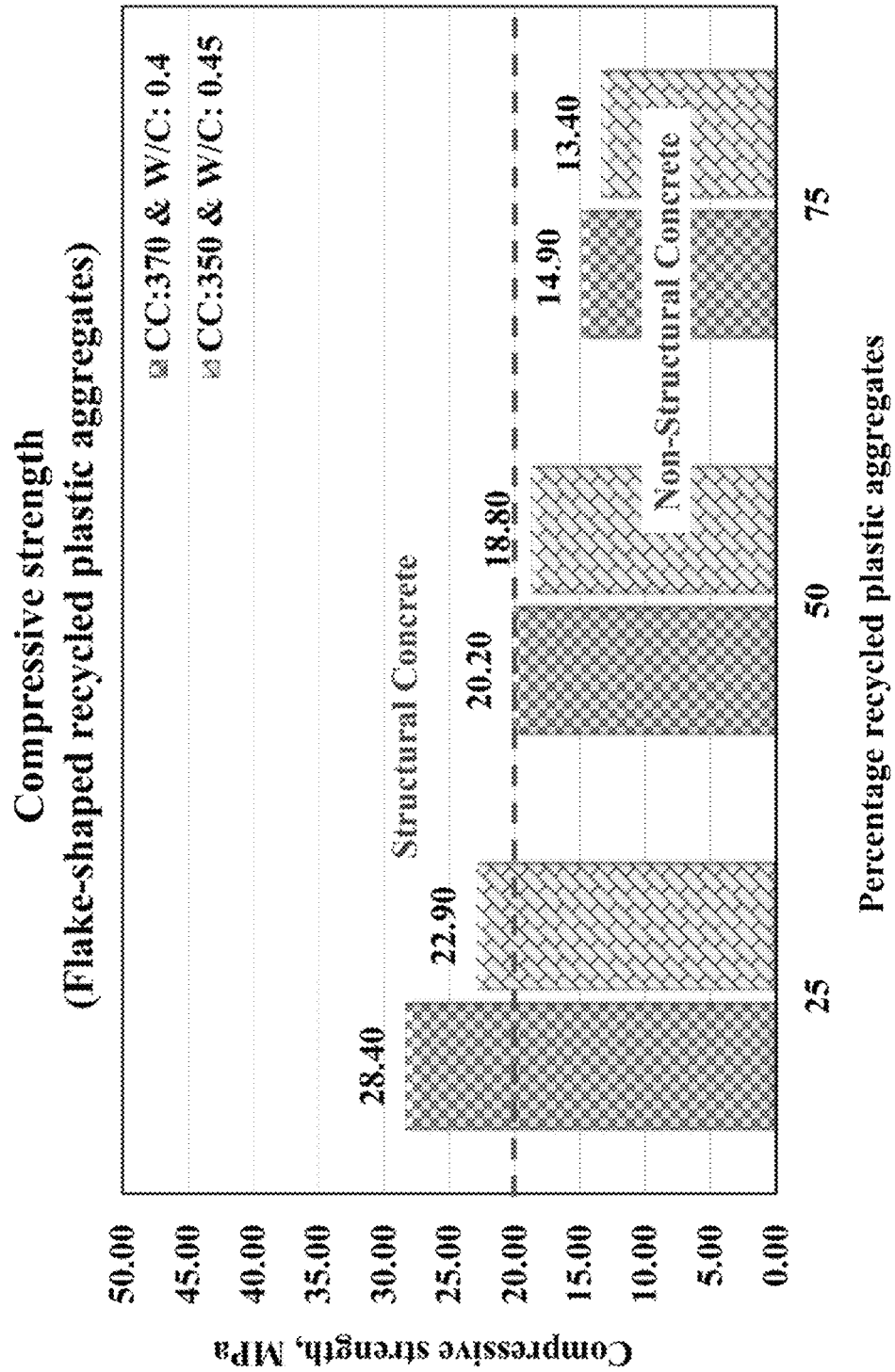
FIG. 10 is a graph of the compressive strengths of the SLWTIC specimens of FIG. 9.
Figure 11:
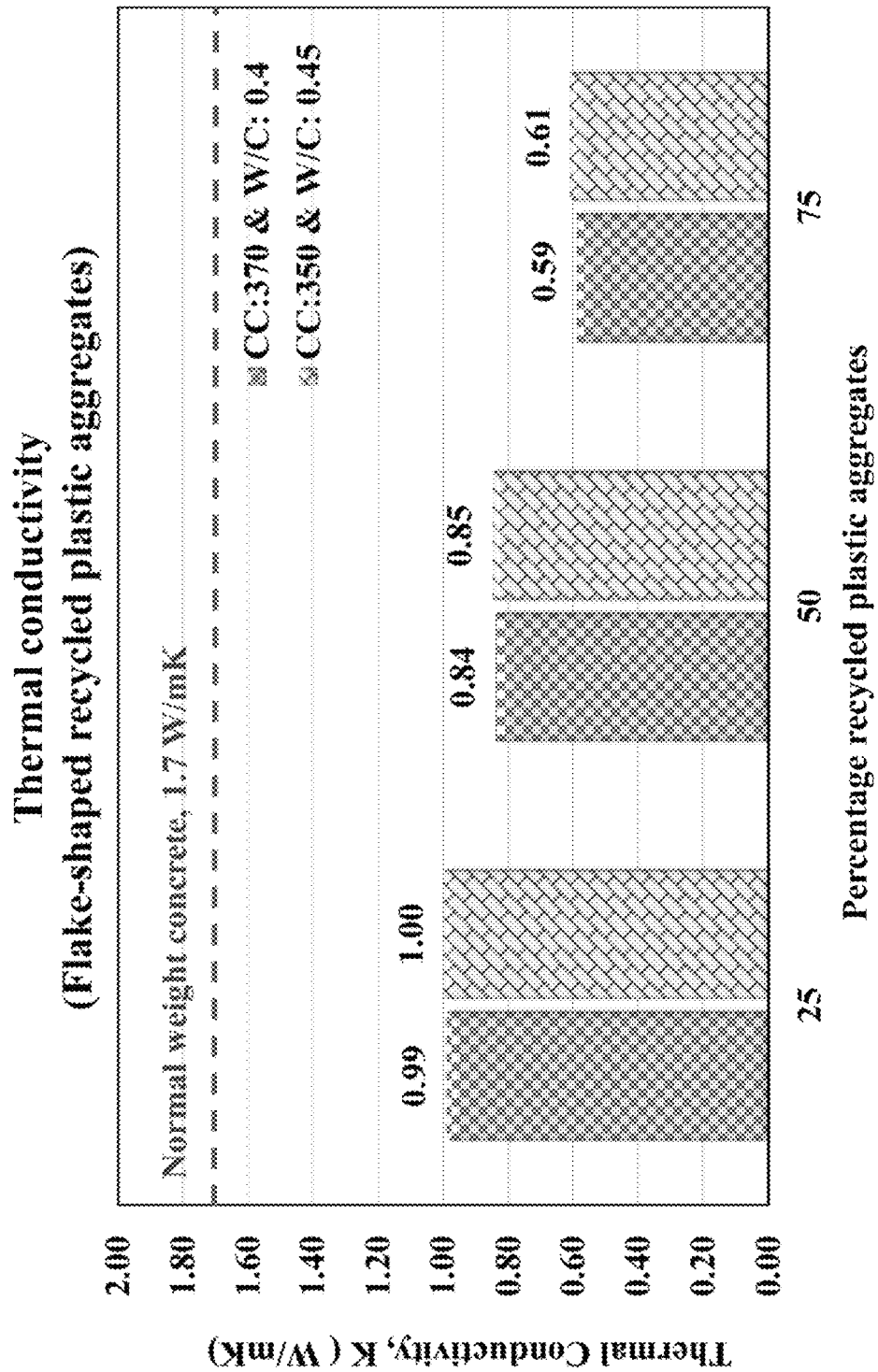
FIG. 11 is a graph showing the thermal conductivities of the SLWTIC specimens of FIG. 9.

Following is a listing of the properties of SLWTIC prepared with flake-shaped recycled plastic aggregates:

1. The unit weight is in the range of 1,607 kg/m³ to 2,061 kg/m³, as shown in FIG. 9. This value is within the unit weight requirements for SLWC.
2. The compressive strength of the developed SLWTIC is in the range of 13.40 MPa to 28.40 MPa, as shown in FIG. 10. A compressive strength of more than 20 MPa was achieved with mixtures containing 25% and 50% of recycled plastic aggregates. Thus, these mixture can be used as structural lightweight concrete. However, mixtures with 75% recycled plastic aggregates, exhibiting compressive strength of less than 20 MPa, can be used as non-structural lightweight concrete.
3. The thermal conductivity of the developed SLWTIC was in the range of 0.59 W/(m·K) to 1.0 W/(m·K) (FIG. 11), which is low compared to the thermal conductivity of NWC which was measured to be 1.7 W/(m·K). Thus, this material can be utilized for thermal insulation purposes.

The developed SLWTIC has the following attributes:

1. They can be used as a lightweight concrete since the unit weight is less than 2,000 kg/m³.
2. Some of the mixtures can be used as structural lightweight concrete since the compressive strength is more than 20 MPa
3. Mixtures with low compressive strength can be used as non-structural lightweight concrete.
4. The thermal conductivity of the developed concrete is much less than that of the normal weight concrete. Thus, it can be used as a thermal insulating material.

Concrete specimens prepared with different percentages of recycled plastic aggregates, as partial replacement of natural limestone aggregates, have exhibited very low unit weight, adequate compressive strength, and low thermal conductivity. Thus, some of the developed SLWTIC mixtures can be utilized as structural lightweight concrete while others can be utilized as non-structural lightweight concrete. All the developed mixtures have exhibited high thermal resistance. The high thermal insulation of the developed SLWTIC will lead to a significant saving in energy required for air conditioning in hot weather conditions and heating in cold regions. Also, the use of recycled plastic in concrete will result in environmental benefits by solving problems associated with the safe disposal of non-biodegradable waste plastic.

The invention claimed is:

1. A method of making a structural lightweight concrete, the method comprising:
    mixing:
        12-25 wt % Portland cement;
        37-57 wt % fine aggregate;
        5-40 wt % coarse aggregate; and
        5-12 wt % water to form a wet concrete slurry, wherein each weight percentage is relative to a total weight of the wet concrete slurry; and
    curing the wet concrete slurry to produce the structural lightweight concrete,
    wherein the fine aggregate is sand with an average particle size of 0.3-1.5 mm,
    wherein the coarse aggregate comprises:
        at least 10 wt % waste plastic pieces having an average longest dimension of 1-12 mm, and
        1-90 wt % of at least one selected from the group consisting of limestone, perlite, and scoria,
        wherein each weight percentage is relative to a total weight of the coarse aggregate,
    wherein the limestone has an average particle size in a range of 1-20 mm,
    wherein the perlite has an average particle size in a range of 1-10 mm,
    wherein the scoria has an average particle size in a range of 1-30 mm, and
    wherein the structural lightweight concrete has
        a compressive strength of 20-40 MPa,
        a thermal conductivity of 0.50-1.10 W/(m·K), and
        a unit weight of 1,400-2,000 kg/m³.

2. The method of claim 1, wherein the waste plastic pieces are in the form of granules, fibers, and/or flakes.

3. The method of claim 2, wherein the waste plastic pieces are in the form of granules having a cylindrical shape with an average diameter of 1-4 mm and an average length of 1-7 mm.

4. The method of claim 2, wherein the waste plastic pieces are in the form of flakes having an average thickness of 0.3-0.8 mm and an average longest dimension of 1-8 mm.

5. The method of claim 2, wherein the waste plastic pieces are in the form of fibers having an average diameter of 0.2-0.8 mm and an average length of 2-12 mm.

6. The method of claim 1, wherein the waste plastic pieces have a specific gravity of 0.80-1.20.

7. The method of claim 1, wherein the waste plastic pieces have a surface roughness Ra of 1-50 μm.

8. The method of claim 1, further comprising reshaping the waste plastic pieces by melting, extruding, or grinding.

9. The method of claim 1, wherein the waste plastic pieces comprise 20-100 wt % polyethylene, relative to a total weight of the weight plastic pieces.

10. The method of claim 1, wherein the wet concrete slurry further comprises 0.1-2.0 wt % of a superplasticizer relative to a total weight of the wet concrete slurry.

11. The method of claim 10, wherein the superplasticizer is a polycarboxylate ether.

12. The method of claim 10, wherein the wet concrete slurry has a slump of 50-150 mm.

13. The method of claim 1, wherein the Portland cement is an ASTM C 150 cement selected from the group consisting of Type I, Type Ia, Type II, Type IIa, Type II(MH), Type II(MH)a, Type III, Type Ma, and Type IV.

14. The method of claim 1, wherein limestone is present, having an average particle size of 5-20 mm.

15. The method of claim 1, wherein the structural lightweight concrete does not comprise fly ash.

16. The method of claim 14, wherein the limestone has a particle size of no greater than 12.5 mm.

17. The method of claim 14, the wet concrete slurry consisting of Portland cement, sand, limestone, waste plastic pieces, water, and superplasticizer.

18. The method of claim 14, the wet concrete slurry consisting of Portland cement, sand, limestone, waste plastic pieces, and water.

\* \* \* \* \*